United States Patent [19]

Menard et al.

[11] 3,910,920
[45] Oct. 7, 1975

[54] 3,14,17-SUBSTITUTED-6,7-TETRAME-THYLENEMORPHINANS

[75] Inventors: Marcel Menard, Candiac; Pierre Rivest, Montreal, both of Canada

[73] Assignee: Bristol-Myers Company, New York, N.Y.

[22] Filed: Nov. 7, 1973

[21] Appl. No.: 413,464

[52] U.S. Cl.. 260/285; 260/240 AL; 260/247.5 GP; 260/570.8 R; 260/570.8 TC; 260/590; 424/260
[51] Int. Cl.²............ C07D 221/38; C07D 491/08; A61K 31/485
[58] Field of Search.................................... 260/285

[56] References Cited
UNITED STATES PATENTS
3,775,414  11/1973  Monkovic et al.................. 260/285
3,819,635  6/1974  Pachter et al...................... 260/285

*Primary Examiner*—Donald G. Daus
*Assistant Examiner*—Diana G. Rivers
*Attorney, Agent, or Firm*—Robert E. Havranek

[57] ABSTRACT

3,14,17-Substituted-6,7-Tetramethylenemorphinans have been found to possess potent narcotic agonist and/or antagonist activity. In particular, the compounds 1-17-cyclopropylmethyl-3,14α (and-14β)-dihydroxy-6,7-tetramethylenemorphinan have been found to possess potent narcotic antagonist activity. These compounds are prepared by total synthesis and are not derived from opium alkaloids.

21 Claims, No Drawings

3,14,17-SUBSTITUTED-6,7-TETRAMETHYLENEMORPHINANS

BACKGROUND OF THE INVENTION

1. Field of the Invention:

This invention embodies new and novel compounds useful as analgesics and/or narcotic antagonists and a new and novel total synthesis for their preparation.

2. Description of the Prior Art:

A. Everette May and Hiroshi Kugita, *J. Org. Chem.* 26, 188 (1961), describe compounds having the formula

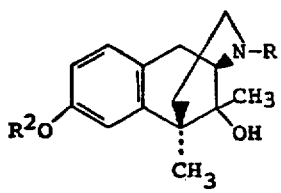

in which $R^2$ is H or methyl and R is methyl or phenethyl as being moderate to weak analgetics.

B. Everette May, Hiroshi Kugita and J. Harrison Ager, *J. Org. Chem.* 26, 1621 (1961), report compounds having the formula

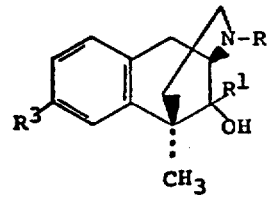

in which R is methyl or phenethyl, $R^1$ is methyl or H, $R^3$ is H, OH or methoxy as producing varying degrees of analgesia.

C. Everette May, Colin Chignell and J. Harrison Ager, *J. Med. Chem.* 8, 235 (1965), report compounds having the formula

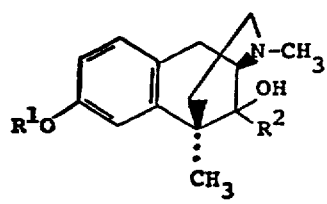

in which $R^1$ is H or methyl and $R^2$ is methyl as possessing analgetic activity.

D. Everette May and Seiichi Sato, *J. Org. Chem.* 26, 4536 (1961), report compounds having the formula

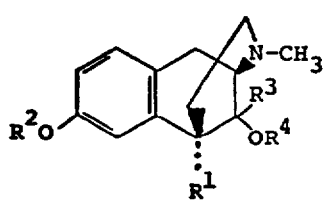

in which $R^2$ is H or methyl, $R^1$ is methyl or ethyl, $R^3$ is methyl or ethyl and $R^4$ is H or acetyl as posessing analgetic activity.

E. N. B. Eddy and E. L. May published a review of 6,7-benzomorphans in *Synthetic Analgetics*, Pergamon Press (1966).

F. Yoshiro Sawa and Shin Maeda, U.S. Pat. No. 3,166,559, report the compounds having the formula

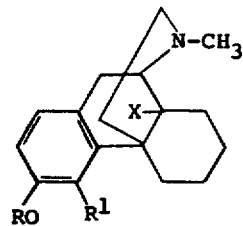

wherein R represents a hydrogen atom or a lower alkyl, $R^1$ represents a hydrogen atom, an aryloxy or a substituted aryloxy and X is hydrogen or OH as having analgetic activity.

G. Yoshiro Sawa, Naoki Tsuzi and Haruhiko Toda, U.S. Pat. No. 3,201,403, report the compounds having the formula

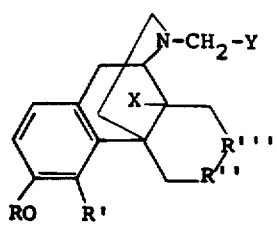

wherein R is lower alkyl, R' is H or aryloxy, R'' and R''' each represent a methylene group or a ketalated carbonyl group or a carbonyl group, X represents H or OH and Y represents a lower alkyl, an aryl or an aralkyl group as possessing analgesic, antitussive and anti-inflammatory activity.

H. Sawa and Tsuzi, U.S. Pat. No. 3,230,224, report the compounds having the formula

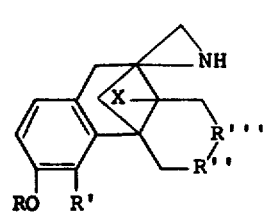

in which R is lower alkyl, R' is H, aryloxy, lower alkoxy, nitro or amino, R'' and R''' each represent methylene, hydroxymethylene, acylated hydroxymethylene, carbonyl group or a ketalated carbonyl group and X is H or OH as possessing antitussive and anti-inflammatory activity.

I. Sawa, Maeda and Tada, U.S. Pat. No. 3,654,280 report the compound having the formula

3

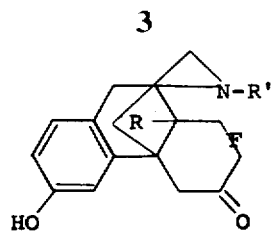

in which R is H or OH, R' is alkyl, ν-ν-dimethyl alkyl or cyclopropylmethyl and F represent the presence or absence of a double bond as being useful narcotic antagonists.

SUMMARY OF THE INVENTION

Compounds having the formula

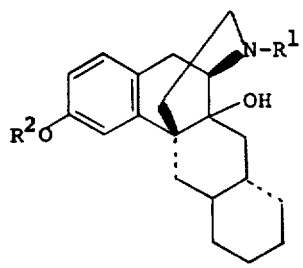

wherein R¹ is selected from the group comprising H, (lower)alkyl,

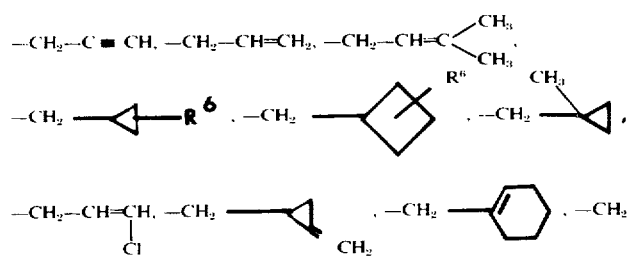

and (lower)alkenyl, in which R⁶ is H or CH₃, R² is selected from the group comprising H, (lower)alkyl,

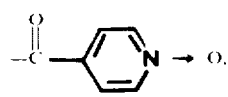

4

(lower)acyl,

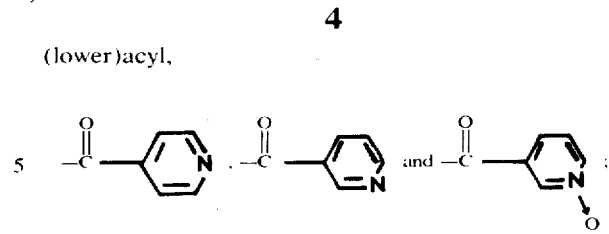

or a pharmaceutically acceptable acid addition salt thereof are analgetic agents, narcotic antagonists or intermediates in the preparation of such agents.

DISCLOSURE OF THE INVENTION

This invention relates to the total synthesis of new and novel 3,14,17-substituted-6,7-tetramethylenemorphinans having the formula

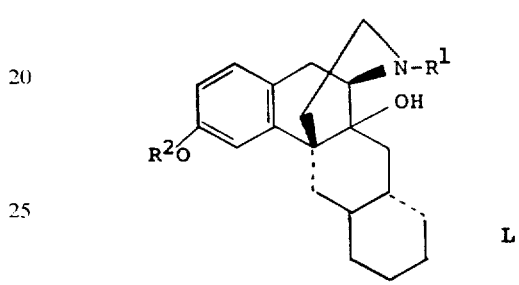

L wherein R¹ is selected from the group comprising H, (lower)alkyl,

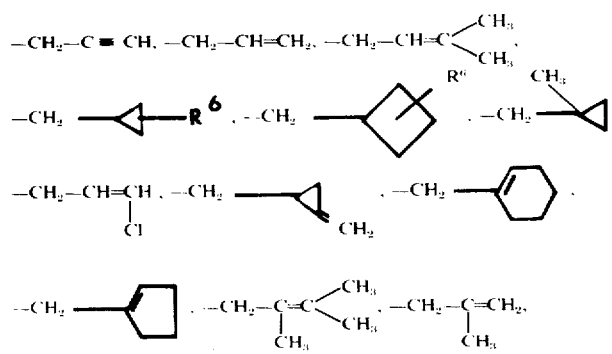

and (lower)alkenyl, in which R⁶ is H or CH₃, R² is selected from the group comprising H, (lower)alkyl,

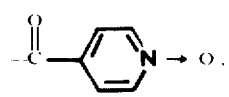

(lower)acyl,

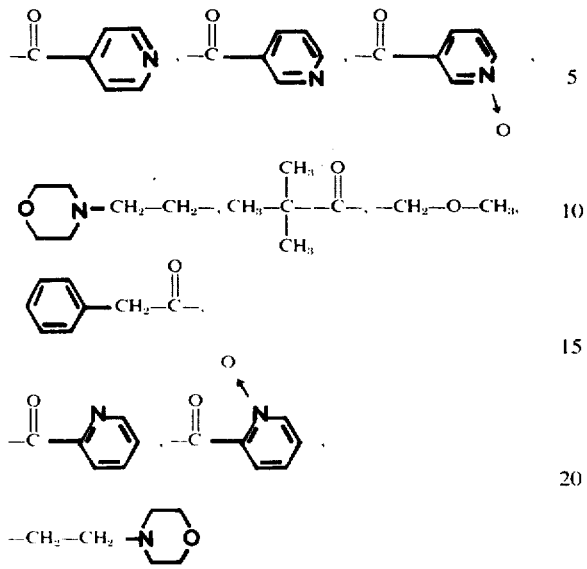

and cinnamoyl; or a pharmaceutically acceptable acid addition salt thereof.

Drug abuse by thrill-seeking youth or by people looking for an escape from the realities of every day life has become more and more common place in our present society. One class of widely abused drugs are the narcotic analgetics such as codeine, morphine, meperidine, etc. It is because of the high addictive potential of these agents that much time and money are being expended by the pharmaceutical industry and by governments to try and discover and develop new non-addicting analgetics and/or narcotic antagonists.

It was therefore an object of the present invention to develop low abuse analgetics and a synthesis that would not be dependent upon opium alkaloids as starting materials and yet would be commercially feasible.

The objectives of the present invention have been achieved by the provision of the compounds of formula L and by their total synthesis from the readily available starting material 7-methoxy-3,4-dihydro-2[1H]-naphthalenone (IIa).

The compounds of the instant invention have the basic tetramethylenemorphinan nucleus which is numbered and represented by the following plane formula Although there are five asymetric carbons (asterisks) in the tetramethylenemorphinan molecule, only the configuration at the 14 carbon is significant to this invention since the configurations at all the other asymmetric centers are fixed. The iminoethano system, attached to position 13 and 9, is geometrically constrained to a cis(1,3-diaxial)-fusion. The 6,7-tetramethylene ring is attached trans to the 6,7-carbons with the 6(1') bond cis and the 7 (4') bond trans to the iminoethano system. As such, these racemates can therefore differ only in the configuration of carbon 14. The only variable will be the cis and trans relationship of the 14(8) carbon substituent to the iminoethano system.

When in the compounds of the present invention the 14(8)-bond is trans to the iminoethano system, we have the 14β-hydroxy-6,7-tetramethylenemorphinans. When the 14(8) bond is cis to the iminoethano system, we have the 14α-hydroxy-6,7-tetramethyleneisomorphinans.

The use of a graphic representation of a 6,7-tetramethylenemorphinan or isomorphinan is meant to include the dl racemic mixture and the resolved d and l isomers thereof.

The compounds of the present invention, the 6,7-tetramethylenemorphinans and 6,7-tetramethyleneisomorphinans, can exist as two optical isomers, the levorotatory and dextrorotatory isomers. The optical isomers can be graphically illustrated as:

6,7-tetramethylenemorphinan

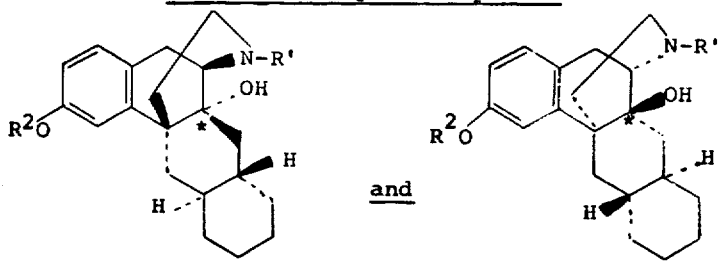

and

6,7-tetramethyleneisomorphinan

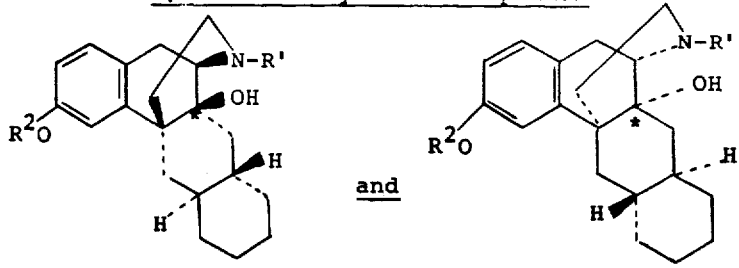

and

The present invention embodies the optical isomers in their resolved form.

The optical isomers can be separated and isolated by fractional crystallization of the diastereoisomeric salts formed, for instance, with d- or l- tartaric acid or D-(+)-α-bromocamphor sulfonic acid. The levorotatory isomers of the compounds of the present invention are the most preferred embodiments. Other acids commonly used for resolution can be employed.

For the purpose of this disclosure, the term "(lower)" is applied to a hydrocarbon radical consisting of 1 to 6 carbon atoms, e.g., methyl, ethoxy, vinyl, ethinyl, etc. The term "(lower)acyl" is an acyl radical of 2 to 6 carbon atoms, e.g., acetyl, propionyl, isobutyryl, etc. The term "pharmaceutically acceptable acid addition salt" is defined to include all those inorganic and organic acid salts of the compounds of the instant invention, which salts are commonly used to produce nontoxic salts of medicinal agents containing amine functions. Illustrative examples would be those salts formed by mixing the compounds of formula L with hydrochloric, sulfuric, nitric, phosphoric, phosphorus, hydrobromic, maleic, malic, ascorbic, citric, tartaric, pamoic, lauric, stearic, palmitic, oleic, myristic, laurylsulfuric, napthalenesulfonic, linoleic, fumaric or linolenic acid, and the like.

The compounds of the instant invention are prepared by a total synthesis comprising multiple steps. The synthesis is efficient and appears commercially feasible. The process is outlined in the following charts.

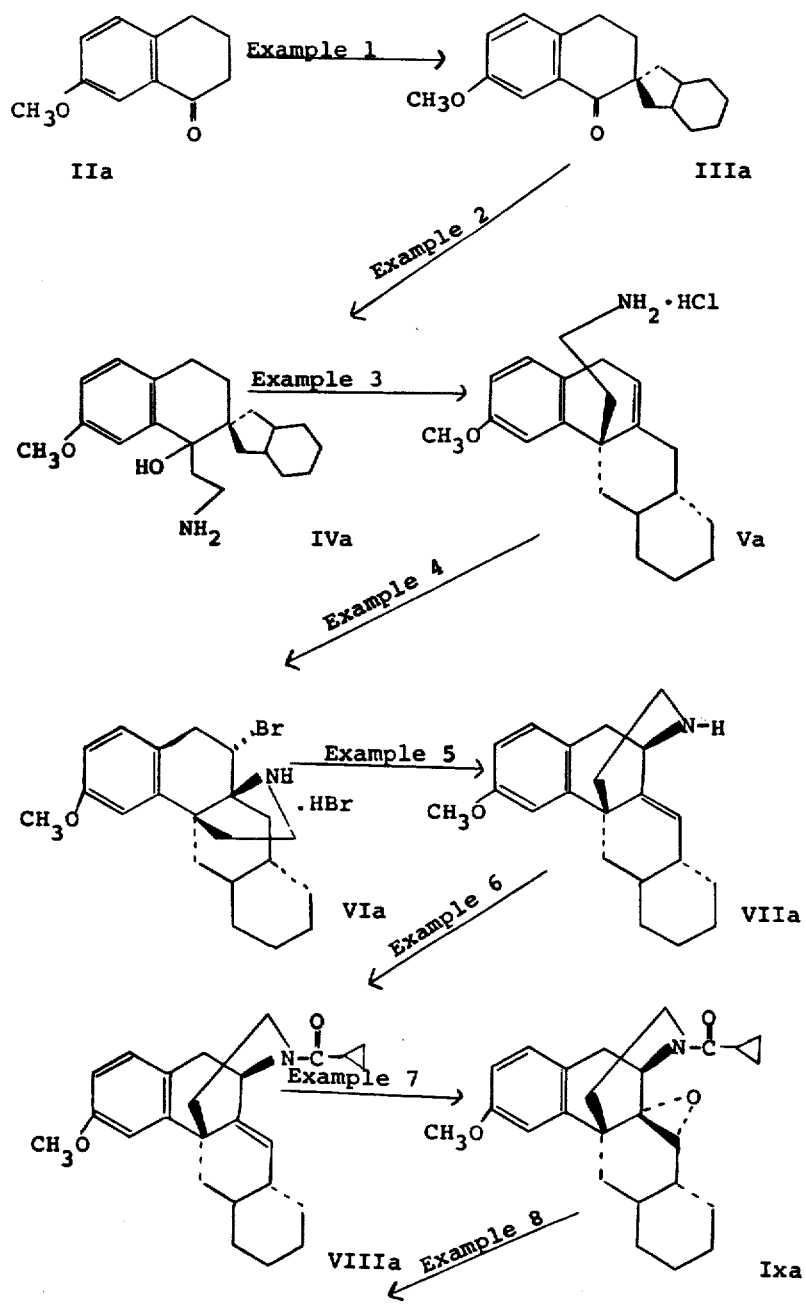

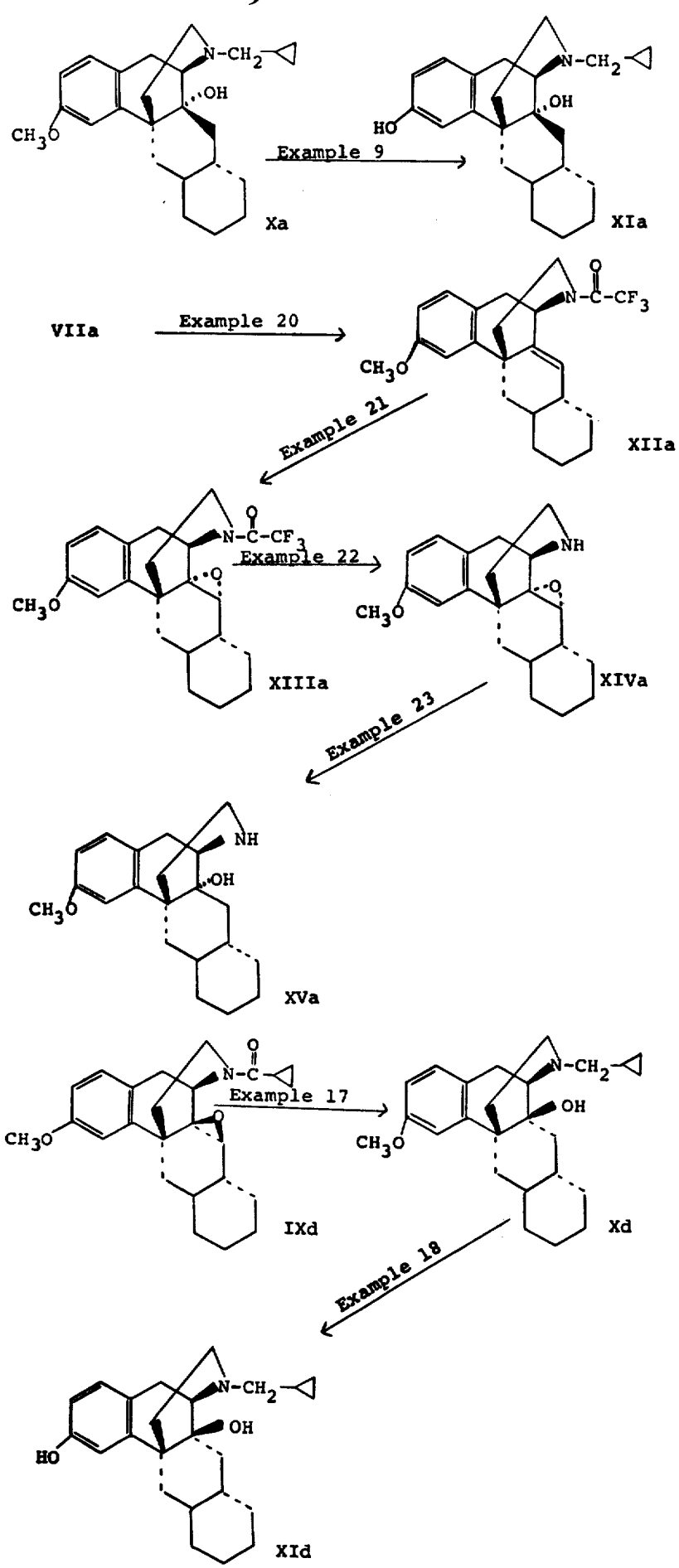

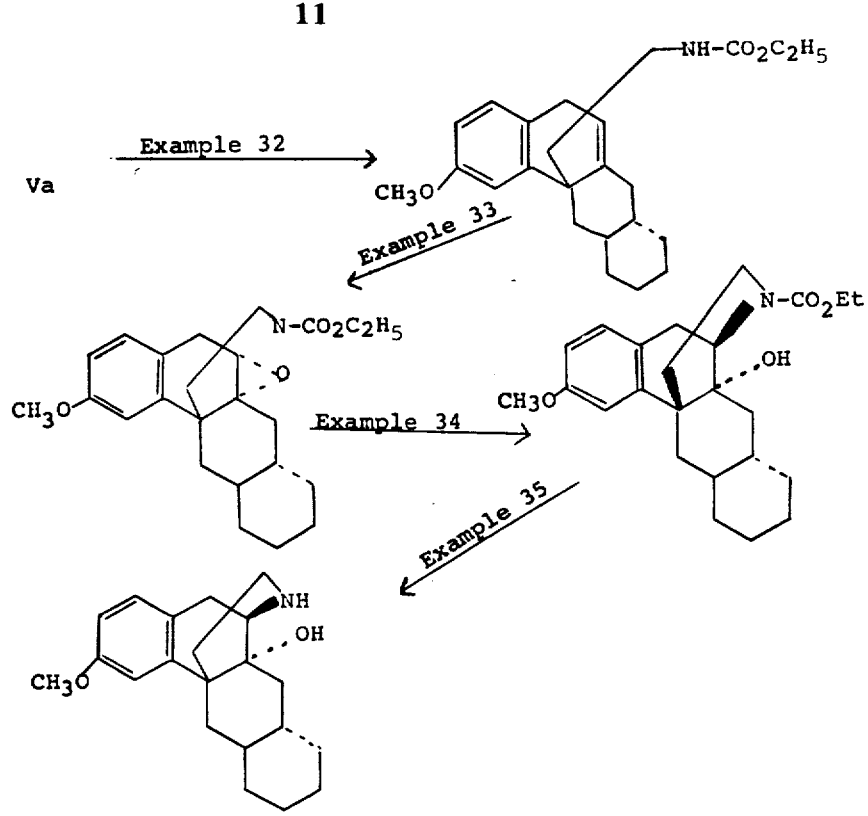
A preferred embodiment of the present invention is a compound having the formula
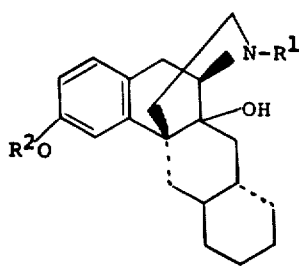
L
wherein $R^1$ is selected from the group comprising —$CH_2$—C ≡ CH, H, —$CH_2$—CH=$CH_2$,
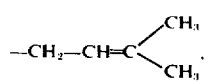
(lower)alkyl,
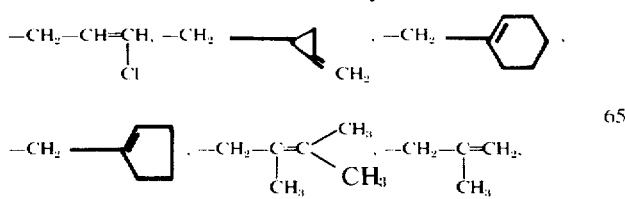
and (lower)alkenyl, in which $R^6$ is H or $CH_3$, $R^2$ is selected from the group comprising H, (lower)alkyl,
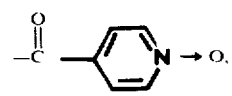
(lower)acyl,
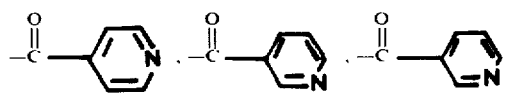
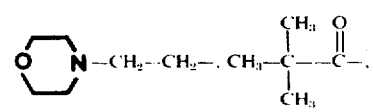
—$CH_2$—O—$CH_3$,
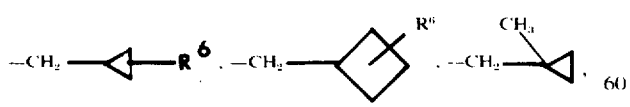
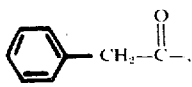
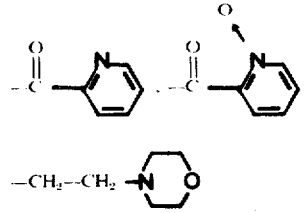

and cinnamoyl; or a pharmaceutically acceptable acid addition salt thereof.

Another preferred embodiment is the compound having the formula

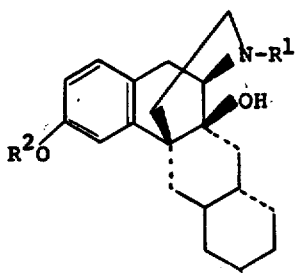

XXXX wherein $R^1$ is selected from the group comprising $-CH_2-C\equiv CH$, H, $-CH_2-CH=CH_2$,

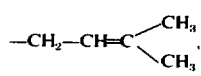

(lower)alkyl,

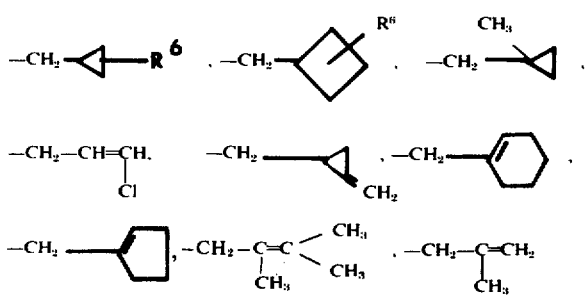

and (lower)alkenyl, in which $R^6$ is H or $CH_3$, $R^2$ is selected from the group comprising H, (lower)alkyl,

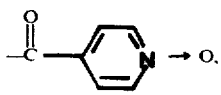

(lower)acyl,

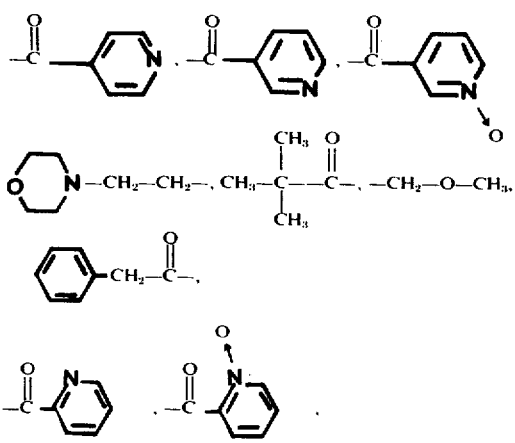

and cinnamoyl; or a pharmaceutically acceptable acid addition salt thereof.

A more preferred embodiment is the compounds of the formula XXXX wherein $R^1$ is $-CH_2-CH=CH_2$, $-CH_2-C\equiv CH$,

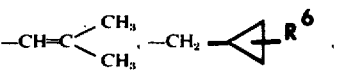

or

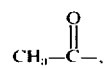

in which $R^6$ is H or $CH_3$ and $R^2$ is H, $CH_3$,

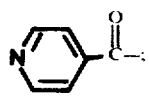

or

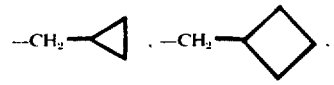

or a pharmaceutically acceptable acid addition salt thereof.

Another more preferred embodiment is the compounds of formula XXXX wherein $R^1$ is

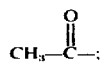

or $-CH_2-CH=CH_2$ and $R^2$ is H, $CH_3$ or

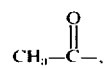

or a pharmaceutically acceptable acid addition salt thereof.

Another preferred embodiment is a compound having the formula

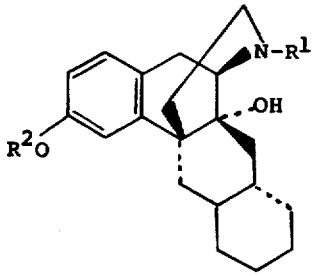

XXXXI wherein $R^1$ is selected from the group comprising $-CH_2-C\equiv CH, -CH_2-CH=CH_2$, $-CH_2-CH=C{\overset{CH_3}{\underset{CH_3}{\diagdown}}}$ H, (lower)alkyl,

[structures: $-CH_2-\triangle R^6$, $-CH_2-\square R^6$, $-CH_2-\triangle$]

[structures: $-CH_2-CH=CH-Cl$, $-CH_2-\triangle$, $-CH_2-\hexagon$ with $CH_2$]

[structures: $-CH_2-\pentagon$, $-CH_2-C(CH_3)=C(CH_3)_2$, $-CH_2-C(CH_3)=CH_2$]

and (lower)alkenyl, in which $R^6$ is H or $CH_3$, $R^2$ is selected from the group comprising H, (lower)alkyl,

[structure: $-C(=O)-\text{pyridyl}\to O$]

(lower)acyl,

[three pyridyl carbonyl structures, last with N→O]

[morpholinyl-$CH_2-CH_2-$, $CH_3-C(CH_3)_2-C(=O)-$, $-CH_2-O-CH_3$]

[phenyl-$CH_2-C(=O)-$]

[two more pyridyl carbonyl structures, $-CH_2-CH_2-$morpholinyl]

and cinnanoyl; or a pharmaceutically acceptable salt thereof.

A more preferred embodiment is the compounds of the formula XXXXI wherein $R^1$ is $-CH_2-CH=CH_2$, $-CH_2-C\equiv CH$, $-CH_2-CH=C{\overset{CH_3}{\underset{CH_3}{\diagdown}}}$, $-CH_2-\triangle-R^6$ or $-CH_2-\square R^6$ in which $R^6$ is H or $CH_3$, $R^2$ is H, $CH_3$, $CH_3-C(=O)-$, or

[structure: pyridyl-C(=O)-]

or a pharmaceutically acceptable acid addition salt thereof.

Another more preferred embodiment is the compounds of formula XXXXI wherein $R^1$ is $-CH_2-\triangle$ , $-CH_2-\square$ .

or $-CH_2-CH=CH_2$, $R^2$ is H, $CH_3$ or $CH_3-C(=O)-$;

or a pharmaceutically acceptable acid addition salt thereof.

Most preferred embodiments are:
1. The compound of formula XXXX wherein $R^1$ is $-CH_2-\triangle$ and $R^2$ is H; or the hydrochloride salt thereof.
2. The compound of formula XXXX wherein $R^1$ is $-CH_2-\square$ and $R^2$ is H; or the hydrochloride salt thereof.
3. The compound of formula XXXX wherein $R^1$ is $-CH_2-CH=CH_2$ and $R^2$ is H; or the hydrochloride salt thereof.
4. The compound of formula XXXX wherein $R^1$ is H and $R^2$ is H or methyl; or an acid addition salt thereof.
5. The compound of formula XXXXI wherein $R^1$ is $-CH_2-\triangle$ and $R^2$ is H; or the hydrochloride salt thereof.
6. The compound of formula XXXXI wherein $R^1$ is $-CH_2-\square$ and $R^2$ is H; or the hydrochloride salt thereof.
7. The compound of formula XXXXI wherein $R^1$ is $-CH_2-CH=CH_2$ and $R^2$ is H; or the hydrochloride salt thereof.
8. The compound of formula XXXXI wherein $R^1$ is H and $R^2$ is H or methyl; or an acid addition salt thereof.

9. The levorotatory isomers of the compound XXXX.

10. The dextrorotatory isomers of the compound XXXX.

11. The levorotatory isomers of the compound XXXXI.

12. The dextrorotatory isomers of the compound XXXXI.

The processes for the preparation of the compounds of the instant invention are new and novel and also constitute preferred embodiments.

A preferred embodiment of the present invention is the process of preparing compounds having the formula

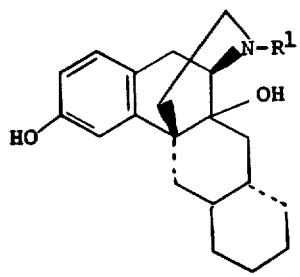

L wherein $R^1$ is selected from the group comprising —$CH_2$—C≡CH, —$CH_2$—CH=$CH_2$,

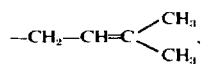

(lower)alkyl,

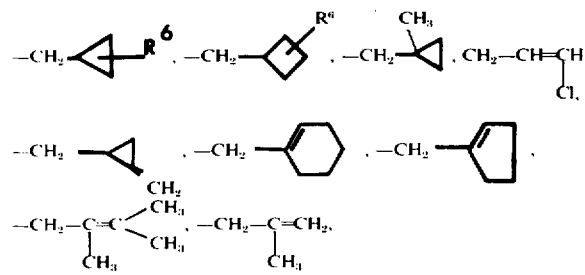

and (lower)alkenyl, in which $R^6$ is H or $CH_3$; which process comprises the consecutive steps of A. treating the compound having the formula

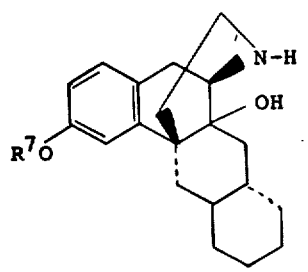

XV in which $R^7$ is (lower)alkyl, with an alkylating or acylating agent having the formula

X—(Z)—W in which W is a radical selected from the group comprising —C≡CH, —CH=$CH_2$,

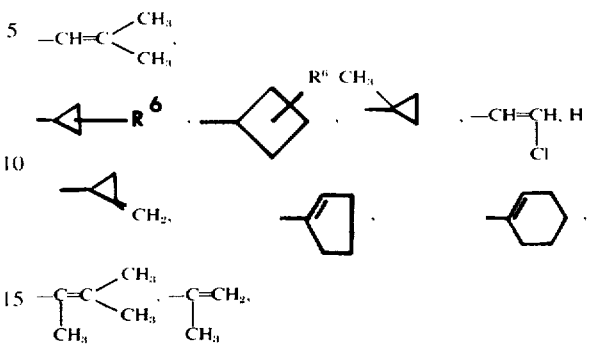

(lower)alkyl of 2–5 carbons, and $C_{2-6}$ alkenyl, in which $R^6$ is H or $CH_3$, Z is carbonyl

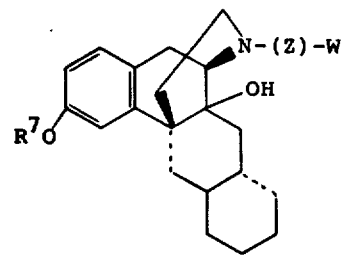

or —$CH_2$— and X is chloro, bromo, or iodo, in an inert organic solvent in the presence of an appropriate base to produce the compound having the formula

XXXXIV in which Z, W, and $R^7$ are as defined above; and when Z is carbonyl

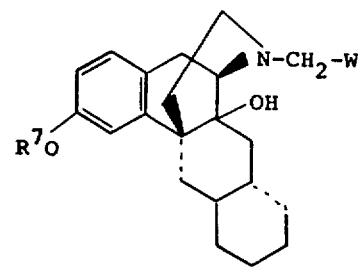

B. treating compound XXXXIV with lithium aluminum hydride, in an organic solvent, to produce the compound having the formula

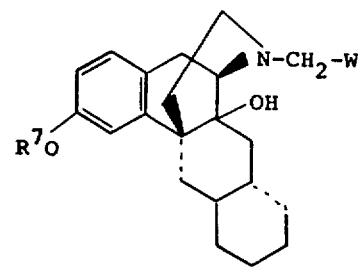

in which $R^7$ and W are as defined above; and

C. cleaving the ether function of compound XXXXIV or XXXXV by treatment with an agent selected from the group comprising NaS—C₂H₅, hydrobromic acid, boron tribromide, pyridine hydrochloride or lithium diphenyl phosphide. ← [(C₆H₅)₂PLi].

For the purpose of this disclosure the term "inert organic solvent" means an organic solvent that does not participate in the reaction to the extent that it emerges unchanged from the reaction. Such solvents are methylene chloride, chloroform, dichloroethane, tetrachloromethane, benzene, toluene, ether, ethyl acetate, xylene, tetrahydrofuran, dioxane, dimethylacetamide, dimethylformamide, and the like when an acid halide is employed. When an alkylation reaction is being performed, the inert solvent used may also include (lower)alkanols such as methanol, ethanol, n-propanol, isopropanol and the like. The term "organic tertiary amine" means a tertiary amine commonly employed as a proton acceptor in acylation reactions. Such amines are tri(lower)alkylamines, e.g., trimethylamine, triethylamine, and the like, pyridine, dimethylaniline, N-methylpiperidine, and the like.

A preferred embodiment of the present invention is the process of preparing compounds having the formula

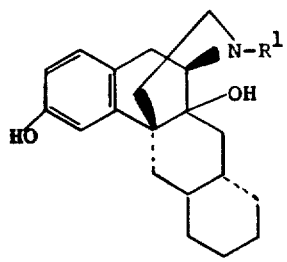

LI wherein R¹ is selected from the group comprising

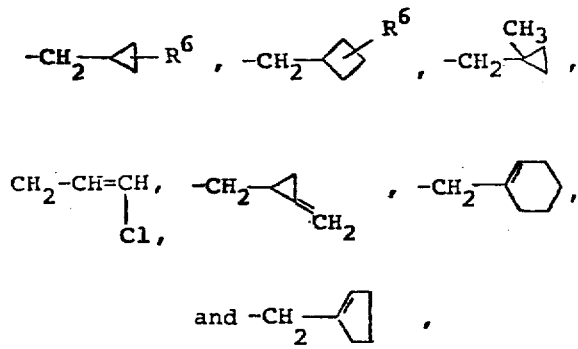

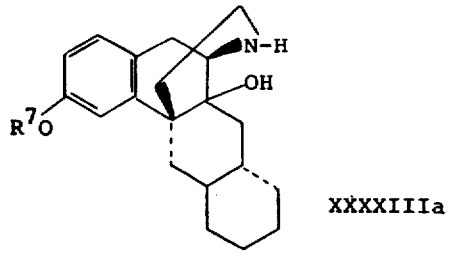

in which R is H or CH₃; which process comprises the consecutive steps of

A. treating the compound having the formula

XXXXIIIa in which R⁷ is (lower)alkyl, with an acylating agent having the formula

in which W is a radical selected from the group comprising

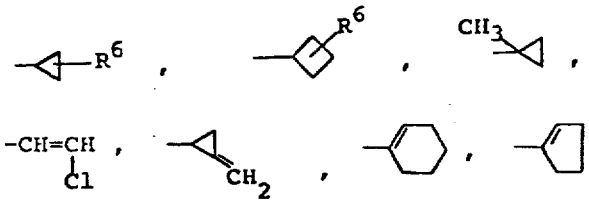

and C₂₋₆ alkyl or alkenyl, in which R⁶ is H or CH₃, and X is chloro, bromo or iodo, in an inert organic solvent in the presence of an appropriate base to produce the compound having the formula

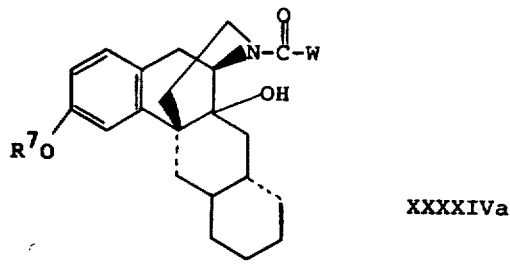

XXXXIVa in which W and R⁷ are as defined above; and

B. treating compound XXXXIVa with lithium aluminum hydride, in an organic solvent, to produce the compound having the formula

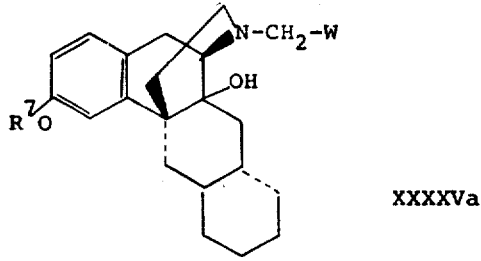

XXXXVa in which R⁷ and W are as defined above; and

C. cleaving the ether function of compound XXXXVa by treatment with an agent selected from the group comprising NaS—C₂H₅, hydrobromic acid, boron tribromide, pyridine hydrochloride or lithium diphenyl phosphite [(C₆H₅)₂PLi].

Another preferred embodiment is the process for preparing compounds having the formula

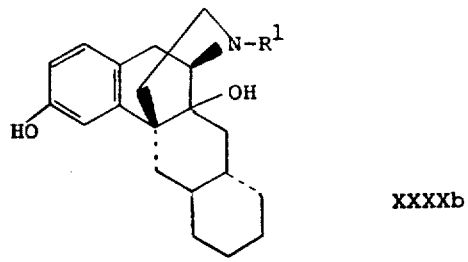

XXXXb wherein R¹ is selected from the group comprising
—CH₂—C≡CH, —CH₂—CH=CH₂,

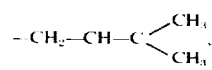

(lower)alkyl of 1 to 6 carbons,

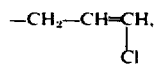

and C$_{3-7}$ alkenyl; which process comprises the consecutive steps of

A. treating the compound having the formula

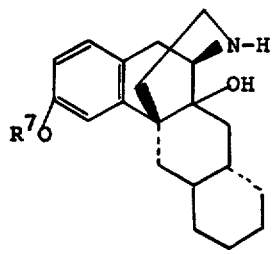

XXXXIIIa in which R$^7$ is (lower)alkyl; with an alkylating agent having the formula R$^1$—X in which R$^1$ is as above and X is chloro, bromo or iodo, in an inert organic solvent in the presence of an appropriate base to produce the compound having the formula

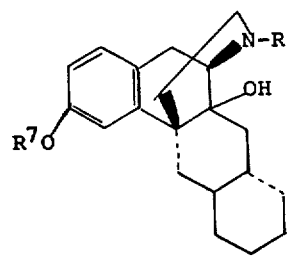

XXXXIVb in which R$^7$ and R$^1$ are as defined above; and

B. cleaving the ether function of compound XXXXIVb by treatment with NaS—C$_2$H$_5$, boron tribromide or pyridine hydrochloride.

Another preferred embodiment of the present invention is a compound having the formula

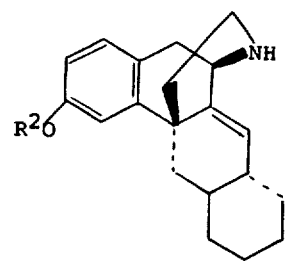

in which R$^2$ is H or (lower)alkyl of 1 to 6 carbon atoms.

Another preferred embodiment of the present invention is the compound having the formula

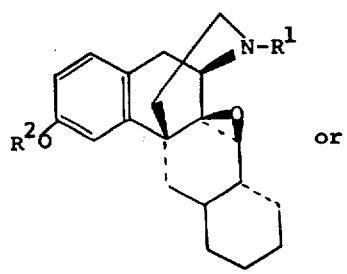

or

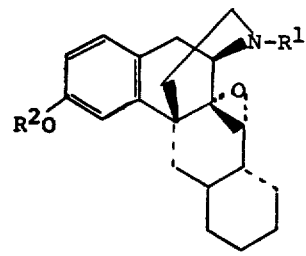

in which R$^2$ is H or (lower)alkyl of 1 to 6 carbon atoms and R$^1$ is selected from the group comprising H, (lower)alkyl,

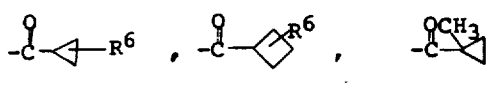

or

in which R$^6$ is H or CH$_3$.

An alternative process for the preparation of compounds having the formula

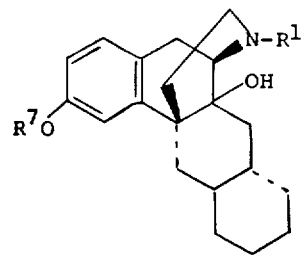

XI in which R$^7$ is (lower)alkyl and R$^1$ is a radical of the formula

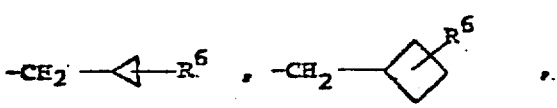

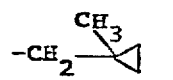

in which R$^6$ is H or CH$_3$, which process comprises
a. acylating the compound having the formula

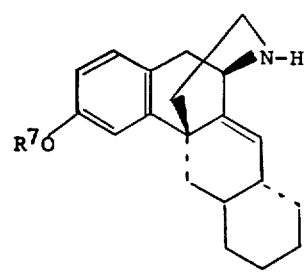

VII in which R$^7$ is (lower)alkyl with an acylating agent having the formula

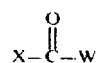

in which W is a radical of the formula

and X is chloro, bromo or iodo, in a ratio of at least 1 mole of acylating agent per mole of compound VII, and preferably in a ratio of about 1.2 to 1, in an inert organic solvent selected from the group consisting of methylene chloride, chloroform, dichloroethane, tetrachloromethane, benzene, toluene, ether, ethyl acetate, xylene, tetrahydrofuran, dioxane, dimethylacetamide and dimethylformamide in the presence of an appropriate base to produce the compound having the formula

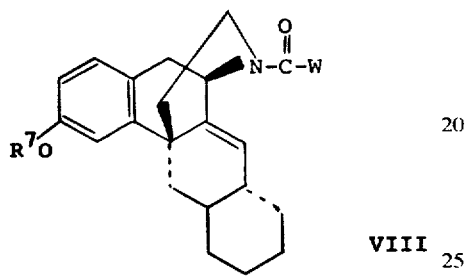

VIII in which $R^7$ and W are as above;

b. oxidizing compound VIII with an excess of a perbenzoic acid, preferably in a ratio of at least 1 moles of perbenzoic acid per mole of compound VIII in an organic solvent such as methylene chloride, chloroform, tetrachloroethylene and the like to produce the compounds having the formula

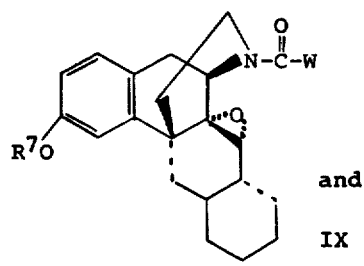

and

IX

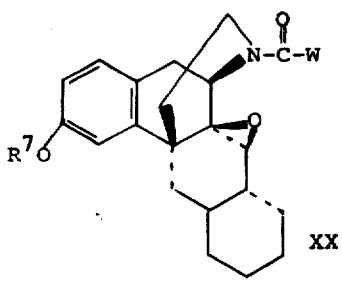

XX which are separated;

c. reducing compound IX or XX, respectively, with at least one mole of lithium aluminum hydride per mole of compound IX or XX but preferably 4–8 moles of lithium aluminum hydride per mole of compound IX or XX, in an inert organic solvent preferably selected from the group comprising diethyl ether, tetrahydrofuran, benzene, toluene, dioxane and the like, with the presence of heat, preferably at about reflux temperature to produce the compounds having the formulas

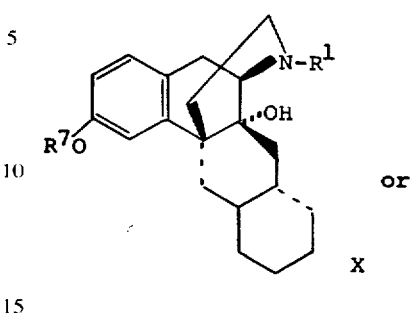

or

X

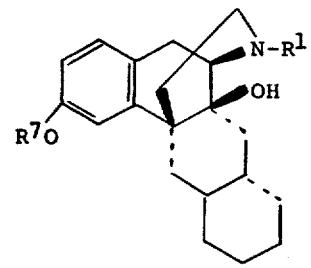

in which $R^1$ and $R^7$ are as defined above; and d. cleaving the ether function of the compounds X by treatment with an agent selected from the group comprising NaS—$C_2H_5$, hydrobromic acid, boron tribromide or pyridine hydrochloride to produce compound XI.

All of the compounds of the preferred embodiments herein are novel and valuable for their properties as analgesic and/or narcotic antagonist agents, or as intermediates in the preparation of compounds having these biological activities.

In particular, the compounds having the formula XI are those which possess the most desirable properties, i.e., analgesic and/or narcotic antagonist properties. Some of these compounds also possess antitussive activity, a property generally inherent with analgetic activity in similar series.

It is well known in the narcotic analgesic prior art that it is possible for some compounds to possess both agonist and antagonist properties. An agonist is a compound that imitates a narcotic analgesic and possesses analgetic qualities. An antagonist is a compound that counteracts the analgetic and euphoric properties of a narcotic analgetic. It is possible for a compound to have both properties. A good example of such a compound is cyclazocine.

In vivo testing was conducted on the compounds herein designated as dl-XIc (racemic mixture), dl-XId, dl-XIa, l-XIa (levorotatory isomer), d-XIa (dextrorotatory isomer) and dl-XIb (see examples for structures) to determine their agonist and/or antagonist properties. Table I represents the results of the experiments. The figures reported are the number of milligrams/kilograms of body weight of compound, corrected to read in terms of the free base, that produced an agonist or antagonist effect in 50% of the mice and rats so tested ($ED_{50}$).

TABLE I

| Test Compounds | ED 50 AGONIST ACTIVITY | | | | mg/kg ANTAGONIST ACTIVITY | | | | | |
|---|---|---|---|---|---|---|---|---|---|---|
| | Phenyl Quinone Mouse | | Writhing[1] Rat | | Oxymorphone[2] Straub Tail | | Oxymorphone[3] Narcosis | | Morphine Antag.[4] Rat Tail Flick | |
| | SC | PO | SC | PO | SC | PO | SC | PO | SC | PO |
| dl-XIc·HCl | 5 | N.D.[5] | N.D. | N.D. | N.D. | N.D. | N.D. | N.D. | N.D. | N.D. |
| dl-XId·HCl | ~40 | N.D. | N.D. | N.D. | 0.63 | N.D. | N.D. | N.D. | 0.045 | N.D. |
| dl-XIa·HCl | ~80 | N.D. | N.D. | N.D. | 0.48 | 49 | ~0.3 | N.D. | 0.040 | 3.8 |
| l-XIa tartrate | 35 | N.D. | ~40 | N.D. | 0.16 | 23 | 0.06 | 0.7 | 0.030 | 3.0 |
| d-XIa tartrate | >40 | N.D. | N.D. | N.D. | >40 | N.D. | N.D. | N.D. | N.D. | N.D. |
| dXIb·HCl | >40 | N.D. | N.D. | N.D. | 2.57 | N.D. | N.D. | N.D. | 0.25 | 6.5 |
| Pentazocine | 3.9 | 36 | 1.0 | N.D. | 12.0 | 187 | 10.0 | 90 | 12.2 | 82.2 |
| Nalorphine | 0.77 | 15 | 0.50 | 19 | 1.14 | >64 | 0.58 | 5.4 | 0.38 | 22.1 |
| Levallorphan | 26.3 (poor dose-response) | N.D. | N.D. | N.D. | 0.29 | 46 | 0.32 | 5.4 | 0.086 | 12.6 |
| Cyclazocine | 0.047 | 4.0 | 0.029 | 5.2 | 0.81 | 24 | 0.12 | 2.7 | 0.040 | 3.7 |
| Naloxone | >40 | N.D. | >40 | N.D. | 0.09 | 13 | 0.02 | 0.95 | 0.010 | 2.7 |

[1] A 50 per cent reduction in number of phenylquinone induced writhings (Siegmund, E. A. et al., Proc. Soc. Biol. & Med. 95, 729; 1957).
[2] Antagonism of Straub Tail induced by oxymorphone (2 mg./kg. sc.) in 50 per cent of mice.
[3] Antagonism of righting reflex loss induced of oxymorphone (1.5 mg./kg. sc.) in 50 per cent of rats.
[4] A 50 reduction of analgesic effect induced by morphine (15 mg./kg. sc.) as measured by the rat tail flick procedure (Harris, L. S. and Pierson, A. K., J. Pharmacol. & Expt. Therap., 143, 141; 1964).
[5] N.D. - Not done.

It is apparent from the table that compound l-XIa exhibits potent antagonist activity upon parenteral administration. All the compounds of formula XI of the present invention possess varying degrees of potency of the same activity. Similarly, as is inherent in most compounds of this type, the compounds possess some subsidiary anti-tussive and analgesic activity.

The normal oral and parenteral dosage range of the compounds of formula XI in adult humans is in the range of about 0.1 to 50 mg. 3 to 4 times a day depending upon the route of administration and the particular compound administered.

It has been reported in the literature that the compound haloperidol, 4[4-(p-chlorophenyl)-4-hydroxypiperidino]-4'-fluorobutyrophenone (Merck Index, 8th Edition, p. 515) has found some experimental use in the alleviation of narcotic addiction withdrawal symptoms. It is therefore an embodiment of the present invention to combine haloperidol with the narcotic antagonists of the instant invention, to produce a product not only preventing narcotic abuse, but at the same time providing supportive therapy in the absence of opiates.

Haloperidol is commonly administered orally in 0.5 to 5.0 mg. 2 to 3 times daily depending upon the severity of the illness. A dose of haloperidol in this range would be administered contemporaneously with an effective dose of the narcotic antagonist to produce the desired result.

Other combinations would include the narcotic antagonists in combination with anti-anxiety agents such as chlorodiazepoxide and diazepam, or phenothiazines like chlorpromazine, promazine or methotrimeprazine.

EXAMPLE 1

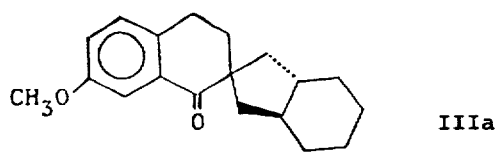

Spiro-[7'-methoxy-trans-hexahydroindane-2,2'-tetral-1'-one] (IIIa)

A solution of 7-methoxy-1-tetralone IIa (121.0 g, 0.69 mole) and trans-1,2-bis (bromomethyl)cyclohexane* (188.0 g., 0.695 mole) in anhydrous benzene (1500 ml) was added, in a fast stream from an addition funnel, to a refluxing mixture of potassium t-butoxide (155.0 g, 1.38 mole) in anhydrous benzene (1500 ml). The mixture was stirred and refluxed for 24 hours. The above operations were carried out under an atmosphere of nitrogen. After cooling, the mixture was washed with 10% hydrochloric acid and with water. Drying and concentration of the organic phase left an oil which was crystallized from methanol to give IIIa as a white solid; 140 g; 69.5%; m.p. 103°–104°.

* The trans-bis-(bromomethyl)cyclohexane was described by G. A. Haggis and L. N. Owen, J. Chem. Soc. 398, (1953).

Anal. Calcd. for $C_{19}H_{24}O_2$: C, 80.24; H, 8.51%. Found: C, 80.53; H, 8.46%

The infrared (IR) and nuclear magnetic resonance (NMR) spectra were consistent with the structure.

EXAMPLE 2

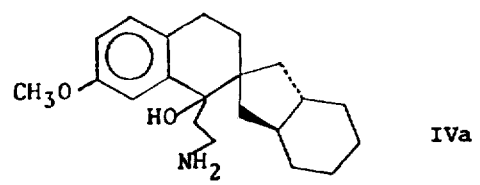

Spiro[1'-β-aminoethyl-1'-hydroxy-7'-methoxy-trans-hexahydroindane-2,2'-tetralin] (IVa)

A solution of acetonitrile (23 g., 0.56 mole) in dry tetrahydrofuran (THF) (500 ml) was added, under nitrogen, over a period of 10 min, to a solution of n-butyllithium (0.564 mole of the commercial 1.6M solution in hexane) in dry THF (338 ml) cooled at −78°. After a 1 hour stirring period at −78°, a solution of the spiroketone IIIa (160 g, 0.56 mole) in THF (600 ml) was added as rapidly as possible from an addition funnel. The cooling bath was removed and the solution was stirred for 15 min. Solid lithium hydride (34 g, 0.90 mole) was added in one portion and the resulting mixture was stirred for 3 hours at room temperature. After cooling to 0°, the excess of hydride was decomposed by the dropwise addition of water (34 ml), aqueous sodium hydroxide (25.5 ml of a 20% solution) and again water (119 ml). The precipitated hydroxides were removed by filtration over Celite and washed with ether (300 ml). The combined filtrates were treated with hydrochloric acid (500 ml of a 10% solution) which brought about the separation of an oil (the hydrochloride of IVa is insoluble in water) which crystallized upon cooling. After filtration, the solid was triturated with acetonitrile and dried to give the crude hydrochloride of IVa as a white powder; m.p. 196°–200°; 140 g; 68%. This crude material was used as such in the next step.

EXAMPLE 3

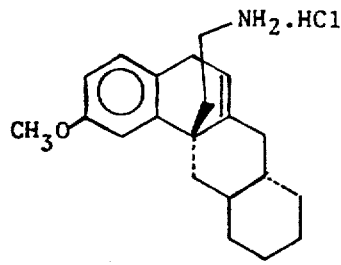

Va

12a-β-aminoethyl-5,7,7a,8,9,10,11,11a,12,12a-decahydro-2-methoxy-7a,11a-trans-benz[a]anthracene (Va).

A mixture of the hydrochloride of IVa (95 g, 0.26 mole), conc. hydrochloride acid (200 ml) and benzene (400 ml) was stirred and refluxed for 3 hours under a nitrogen atmosphere. The hot solution was transferred to a separatory funnel and the phases decanted. The aqueous phase was extracted with benzene (200 ml) and the combined benzene layers were diluted with ether (600 ml). Upon cooling, the hydrochloric acid salt of Va separated as colorless crystals. A further crop of solid was obtained by concentration of the filtrates and dilution with ether. Recrystallization from ethanol-ether gave the pure hydrochloride Va as crystals; m.p. 130°; 76%.

Anal. Calc'd for $C_{21}H_{29}NO \cdot C_2H_5OH \cdot HCl$: C, 70.14; H, 9.21; N, 3.55%. Found: C, 70.51; H, 8.76; N, 3.74%

The IR and NMR spectra were consistent with the structure.

EXAMPLE 4

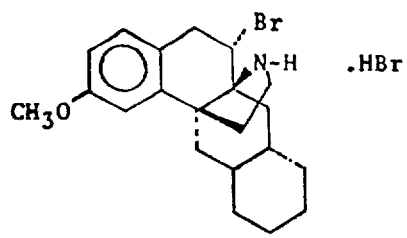

VIa

9α-bromo-3-methoxy-6,7-trans-tetramethylene hasubanan (VIa).

A solution of the amine Va (101.6 g, 0.32 mole, free base prepared from the hydrochloride) in reagent grade chloroform (200 ml) was added in one portion to a vigorously stirred solution of bromine (52.8 g, 0.32 mole) in chloroform (7000 ml). After stirring for 5 min., the reaction mixture was concentrated on a rotary evaporator at 35°–40° under water-aspirator vacuum. The resulting solid residue (VIa) was recrystallized from acetone; 102.0 g; 65%; m.p. 225°–228° d.

Anal. calc'd for $C_{21}H_{28}BrNO \cdot HBr$: C, 53.52; H, 6.20; N, 2.97%. Found: C, 53.21; H, 6.17; N, 3.06%

The IR and NMR spectra were consistent with the structure.

EXAMPLE 5

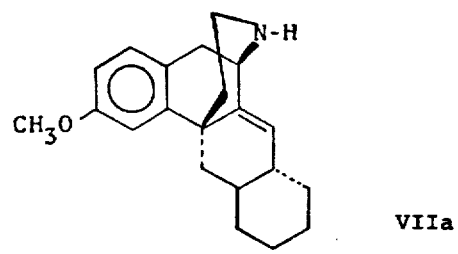

VIIa 3-methoxy-6,7-trans-tetramethylene-Δ⁸-morphinan (VIIa).

A mixture of the amine hydrobromide VIa (97.34 g, 0.206 mole) anhydrous sodium bicarbonate (17.3 g, 0.207 mole) and dry dimethylformamide (DMF) (700 ml) was heated in an oil bath at 110°–115° for 1.5 hour with vigorous stirring. After cooling, the mixture was poured into a sat. sodium bicarbonate solution (1000 ml) and extracted with benzene (3 × 200 ml). The combined benzene layers were washed with water (5 × 100 ml), dried ($Na_2SO_4$) and concentrated to leave an oil (63.7 g) (100%) that can be used as such for the next step. The oil was dissolved in ether and treated with an excess of oxalic acid in ether to give a semi-solid mass. This was dissolved in a minimum amount of methanol and diluted with a large volume of ether to give the oxalic acid salt of VIIa as a white solid; m.p. 186°–7°; 95%.

The analytical sample was recrystallized from 2-propanol.

Calc'd for $C_{21}H_{27}NO \cdot C_2H_2O_4$: C, 69.15; H, 7.32; N, 3.51. Found: C, 68.87; H, 7.53; N, 3.46.

The IR and NMR spectra are consistent with the structure.

EXAMPLE 6

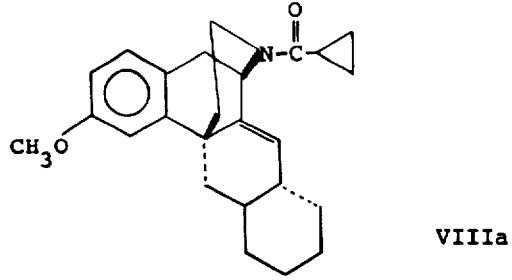

VIIIa 17-cyclopropylcarbonyl-3-methoxy-6,7-trans-tetramethylene-Δ⁸-morphinan (VIIIa).

Cyclopropylcarbonyl chloride (4.5 g, 0.043 mole) was added dropwise to a stirred and cooled (0°) solution of the amine VIIa (11.62 g, 0.037 mole) and pyridine (3.75 g, 0.047 mole) in methylene chloride (45 ml). After the end of the addition, the mixture was stirred for 10 min at 0° and poured into ice-cold hydrochloric acid (25 ml of a 10% solution). The aqueous phase was decanted and the organic phase was washed with water (25 ml), dried ($Na_2SO_4$) and concentrated. The residue was recrystallized from ether; 11 g; 80%; m.p. 186°–188° (VIIIa).

The analytical sample was prepared in ethyl acetate; m.p. 187°–9°C.

Calc'd. for $C_{25}H_{31}NO_2$: C, 79.54; H, 8.28; N, 3.71%. Found: C, 79.33; H, 8.25; N, 3,58%.

The IR and NMR spectra were consistent with the structure.

EXAMPLE 7

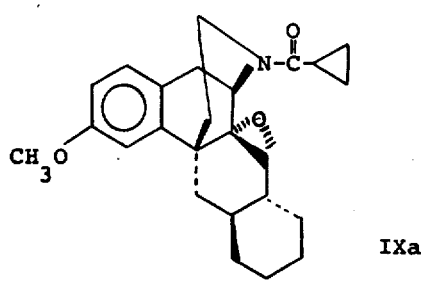

IXa 17-cyclopropylcarbonyl-8,14α-epoxy-3-methoxy-6,7-trans-tetramethyleneisomorphinan (IXa).

m-Chloroperbenzoic acid (6.15 g of the commercial 85% compound) was added portionwise to a stirred and cooled (0°) solution of the unsaturated amide (VIIIa) (10.0 g, 0.0255 mole) in methylene chloride (300 ml). After stirring at room temperature for 18 hours, the mixture was washed with a 10% solution of sodium bisulfite (50 ml), with a 10% solution of sodium carbonate (3 × 50 ml) and with a saturated salt solution (2 × 50 ml). After drying and concentration of the organic phase, the oily residue was crystallized from ether; m.p. 162°–164°; (48%). The ether filtrates were saved for the isolation of the morphinan isomer (see Example 17).

Anal. calc'd. for $C_{25}H_{31}NO_2$: C, 76.30; H, 7.94; N, 3,56. Found: C, 76.59; H, 8.01; N, 3,48.

The IR and NMR spectra were consistent with the structure.

EXAMPLE 8

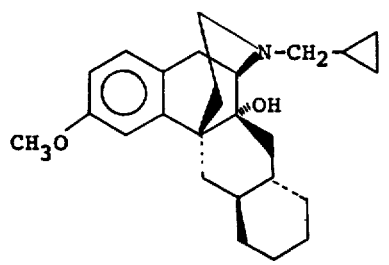

Xa 17-cyclopropylmethyl-14α-hydroxy-3-methoxy-6,7-trans-tetramethyleneisomorphinan (Xa).

The amido epoxide IXa (11.57 g, 0.0295 mole) was added in small portions to a slurry of lithium aluminum hydride (6.0 g, 0.16 mole) in dry THF (100 ml). The mixture was heated under reflux for 1 hour, cooled to 0°, and decomposed by the dropwise addition of water (6.0 ml), aqueous sodium hydroxide (4.5 ml of a 20% solution) and water (21.0 ml). The precipitated hydroxides were removed by filtration over Celite and washed with ether (200 ml). The combined filtrates were extracted with hydrochloric acid (3 × 50 ml of a 10% solution), the combined acidic layers were made alkaline with conc. ammonium hydroxide and extracted with methylene chloride (3 × 100 ml). Drying ($Na_2SO_4$) and concentration left an oil which was dissolved in ether and petroleum ether (200 ml, 1:1). After drying with $Na_2SO_4$, it was filtered over Celite and the Celite washed with 200 ml of the ether-petroleum ether mixture. Dry HCl was bubbled through the solution and the solid hydrochloride was collected by filtration and washed with ether-petroleum ether; 11.26 g (90%); m.p. 255° – 260°C. (Xa).

Calc'd for $C_{25}H_{33}NO_2.HCl$: C, 71.83; H, 8.68; N, 3.35%. Found: C, 71.84; H, 8.70; N, 3.27%.

The IR and NMR spectra were consistent with the structure.

EXAMPLE 9

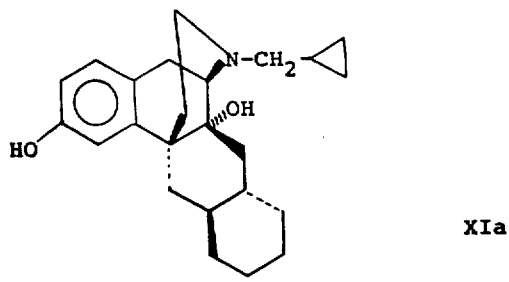

XIa 17-cyclopropylmethyl-3,14α-dihydroxy-6,7-trans-tetramethyleneisomorphinan (XIa).

A solution of the amine Xa (from 1.75 g of the hydrochloride neutralized with ammonium hydroxide and extracted with methylene chloride) in methylene chloride (40 ml) was added over a period of 1 hour to a stirred and cooled (0°) solution of boron tribromide (1.25 ml, 0.019 mole) in methylene chloride (15 ml). After the end of the addition, the mixture was stirred 3 hours at room temperature, cooled to 0° and decomposed with water (15 ml) and conc. ammonium hydroxide (20 ml). After decantation, the aqueous phase was again extracted with methylene chloride (40 ml) and the combined organic layers were washed with a sat. salt solution (15 ml). After drying ($Na_2SO_4$) and concentration, the residue was dissolved in ether (100 ml) and treated with hydrochloric acid (20 ml of a 10% solution). The solid hydrochloride of Xa was collected by filtration and recrystallized from methanol-ether; 50%; m.p. 272°–273°.

Anal. calc'd. for $C_{24}H_{33}NO_2.HCl$: C, 71.35; H, 8.48; N, 3.47. Found: C, 71.28; H, 8.53; N, 3.27

The IR and NMR spectra was consistent with the structure.

EXAMPLE 10

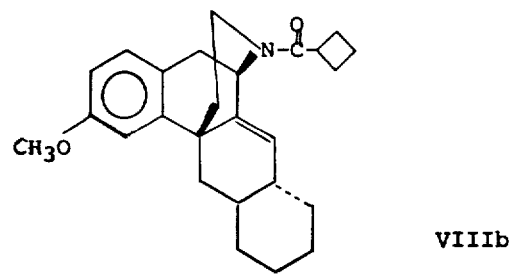

VIIIb 17-cyclobutylcarbonyl-3-methoxy-6,7-trans-tetramethylene-Δˣ-morphinan (VIIIb).

Substitution in the procedure of Example 6 for the cyclopropylcarbonyl chloride used therein of an equimolar quantity of cyclobutylcarbonyl chloride produced an 85% yield of the title product XIIIb; m.p. 150°–152°C.

The analytical sample was prepared from ethyl acetate-petroleum ether; m.p. 155° – 157°C.

Calc'd for $C_{26}H_{33}NO_2$: C, 79.75; H, 8.49; N, 3.57%. Found: C, 80.04; H, 8.44; N, 3.48%.

The IR and NMR spectra were consistent with the structure.

EXAMPLE 11

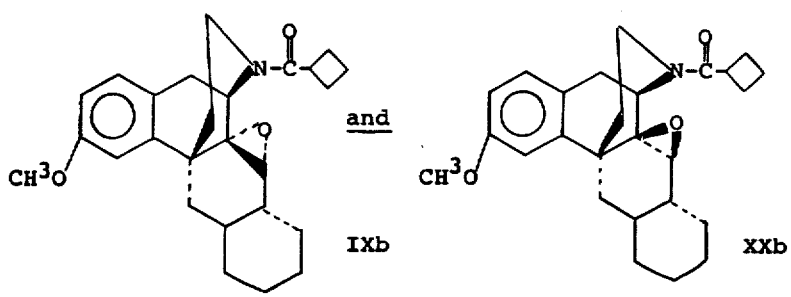

17-cyclobutylcarbonyl-8,14α and 14β-epoxy-3-methoxy-6,7-trans-tetramethyleneisomorphinan and morphinan (IXb and XXb respectively).

Substitution in the procedure of Example 7 for the compound IXa used therein of an equimolar quantity of compound VIIIb produced a mixture of compounds IXb and XXb as an oil. Crystallization from ether gave 4.0 g of IXb as a white solid m.p. 198°–200°. The filtrates, after standing for 4 days, deposited another crop of IXb (ca 3 g, contaminated with a small amount of XXb). The new filtrates were concentrated in a vacuum and crystallized from ether to afford 6.0 g of XXb as a while solid.

The analytical sample of XXb was prepared from benzene-ether; m.p. 135°–138°.

Calc'd. for $C_{26}H_{33}NO_3 \cdot 1/2C_6H_6$: C, 77.47; H, 8.74; N, 3.15%. Found: C, 77.50; H, 8.12; N, 3.02%.

The IR and NMR spectra of both compounds were consistent with the structure.

EXAMPLE 12

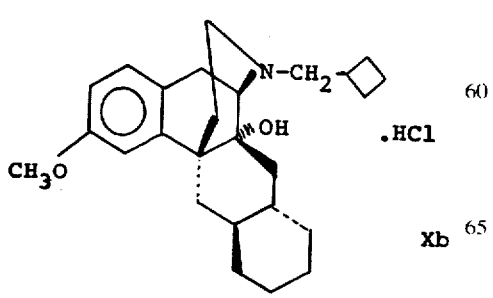

Xb 17-cyclobutylmethyl-14α-hydroxy-3-methoxy-6,7-trans-tetramethyleneisomorphinan (Xb).

Substitution in the procedure of Example 8 for the compound IXa used therein of an equimolar quantity of compound IXb produced the title compound Xb. The hydrochloride was collected and recrystallized from methanol-ether; m.p. 255°–265°C with decomposition; 50%.

Anal. calc'd. for $C_{26}H_{37}NO_2 \cdot HCl$: C, 72.28; H, 8.87; N, 3.24. Found: C, 72.28; H, 8.88; N, 3.16%.

The IR and NMR spectra were consistent with the structure.

EXAMPLE 13

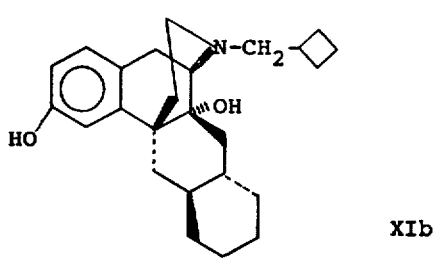

XIb 17-cyclobutylmethyl-3,-α-dihydroxy-6,7-trans-tetramethyleneisomorphinan (XIb).

Substitution in the procedure of Example 9 for the compound Xa used therein on an equimolar quantity of compound Xb produced the title compound XIb as the hydrochloride salt; m.p. 276°–277°C; 65%.

Anal. calc'd. for $C_{25}H_{35}NO_2 \cdot HCl$: C, 71.83; H, 8.68; N, 3.35. Found: C, 71.37; H, 8.74; N, 3.12.

The IR and NMR spectra were consistent with the structure.

EXAMPLE 14

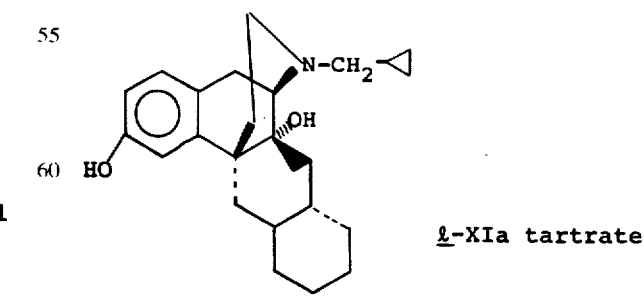

l-XIa tartrate l-17-cyclopropylmethyl-3,14α-dihydroxy-6,7-trans-tetramethyleneisomorphinan (l-XIa)tartrate A boiling solution of d-tartaric acid (1.52 g, 0.0102 mole) in methanol (5 ml) was added to a boiling solution of XIa (3.73 g, 0.0102 mole) in methanol (25 ml). After standing at room temperature for 24 hours, the crystals were collected by filtration; 3.0 g, no optical rotation. Repeated recrystallization at high dilution from methanol gave the following rotations:

1. $[\alpha]_D^{20}$ = −80.7; 2. −84.5; 3. −89; 4. −91.8; 5. −91.7 (0.20 g).

Anal. calc'd for $C_{24}H_{33}NO_2 \cdot 1/2C_4H_6O_6 \cdot 1/2CH_3OH$: C, 69.40; H, 8.35; N, 3.05%. Found: C, 69.50; H, 8.12; N, 3.28%.

EXAMPLE 15

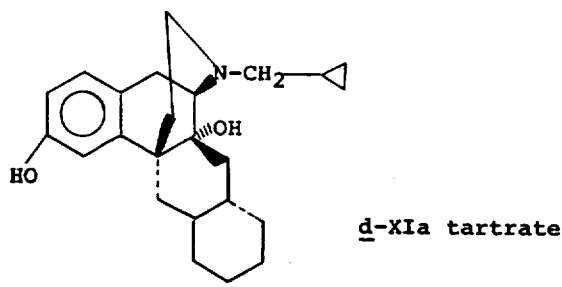

d-XIa tartrate d-17-Cyclopropylmethyl-3,14α-dihydroxy-6,7-trans-tetramethyleneisomorphinan (d-XIa)tartrate.

The d-isomer was prepared like the l-isomer V (Example 14) starting with l-tartaric acid and the free base obtained from the filtrates of crystallization of the l-isomer. It was isolated as the half salt of l-tartaric acid; $[\alpha]_D^{20}$ = 96.73 (methanol); m.p. 195° – 200° d.

Calc'd. for $C_{24}H_{33}NO_2 \cdot 1/2C_4H_6O_6 \cdot 1/2CH_3OH$: C, 69.40; H, 8.35; N, 3.05%. Found: C, 69.32; H, 8.06; N, 3.37%.

EXAMPLE 16

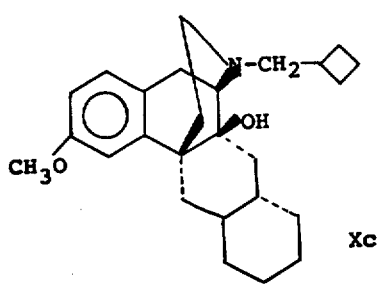

Xc 17-cyclobutylmethyl-14β-hydroxy-3-methoxy-6,7-trans-tetramethylenemorphinan (Xc).

Substitution in the procedure of Example 8 for the epoxide IXa used therein of an equimolar quantity of XXb (obtained in Example 11) produced the title compound Xc as a white solid; m.p. 92°–94° (ethanol).

Anal. Calc'd. for $C_{26}H_{37}NO_2$: C, 78.94; H, 9.43; N, 3.54%. Found: C, 78.67; H, 9.54; N, 3.43%.

The IR and NMR spectra were consistent with the structure.

EXAMPLE 17

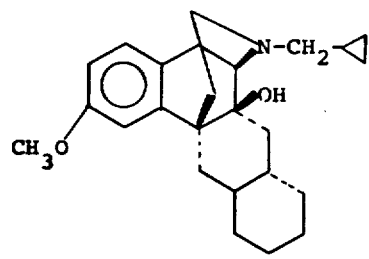

Xd 17-cyclopropylmethyl-14β-hydroxy-3-methoxy-6,7-trans-tetramethylenemorphinan (Xd).

The ether filtrates from the preparation of IXa (Example 7) were concentrated and chromatographed over silica gel (500 g) eluting with 30% ether in petroleum ether and collecting 50 ml fractions. Fractions 1 to 4 gave traces of starting material VIIIa. Fractions 5 to 10 gave the isomorphinan isomer IXa, fractions 11–19 gave 2.55 g (20% overall) of the β-isomer, 17-cyclopropylcarbonyl-8,14β-epoxy-3-methoxy-6,7-trans-tetramethylene morphinan, as a semi-solid (IXd). An equimolar quantity of the crude semi-solid (IXd) was substituted in the procedure of Example 8 for the compound IXa used therein to produce the title compound Xd which was collected as the hydrochloride in the form of colorless crystals; 2.61 g., m.p. 279°–281°C. (methanol ether).

EXAMPLE 18

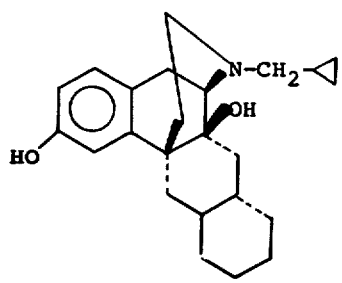

17-cyclopromethyl-3,14β-dihydroxy-6,7-trans-tetramethylenemorphinan (XId).

The free amine compound Xd (2.47 g., 0.0065 mole) prepared by neutralization of the hydrochloride salt was O-demethylated with boron tribromide (1.5 ml., 0.016 mole) in methylene chloride (20 ml.) in accordance with the procedure found in Example 9. The title product IXd was isolated as the hydrochloride salt: 1.5 g.; 42%; m.p. 271°–274°C.

Anal. calc'd. for $C_{24}H_{33}NO_2 \cdot HCl$: C, 71.35; H, 8.48; N, 3.47. Found: C, 71.06; H, 8.59; N, 3.40.

The IR and NMR spectra were consistent with the structure.

EXAMPLE 19

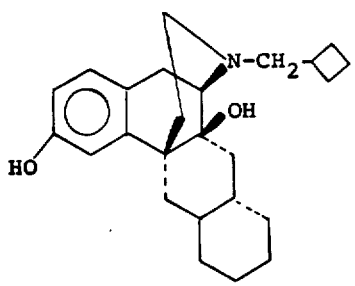

17-cyclobutylmethyl-3,14β-dihydroxy-6,7-trans-tetramethylenemorphinan (XIc).

Substitution in the procedure of Example 9 for the compound Xa used therein of an equimolar quantity of Xc produced an oil (XIc) which was dissolved in ether, filtered over Celite to remove some insoluble material, and treated with an excess of anhydrous hydrogen chloride. The white solid hydrochloric acid salt of XIc was collected by filtration and recrystallized in ethanol-ether; m.p. 264°–274° d.; 67%.

Anal. calc'd. for $C_{25}H_{35}NO_2 \cdot HCl$: 71.83; H, 8.68; N, 3.35%. Found: C, 71.90; H, 8.72; N, 3.23%.

The IR and NMR spectra were consistent with the structure.

EXAMPLE 20

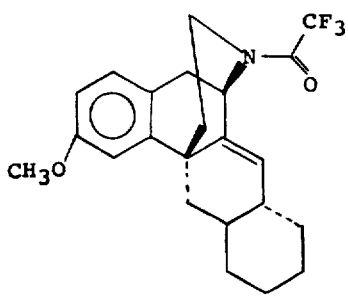

3-methoxy-6,7-trans-tetramethylene-17-trifluoroacetyl-Δ⁸-morphinan (XIIa).

Trifluoroacetic anhydride (80 ml, 0.56 mole) was added as rapidly as possible, keeping the temperature at 0° – 5°, to an ice-cooled, vigorously, stirred mixture of the amine VIIa (30.25 g, 0.095 mole) and anhydrous $Na_2CO_3$ (60 g, 0.7 mole) in anhydrous ether (160 ml). The mixture was stirred vigorously at room temperature for 1 hour, ice was added at hydrolyze the excess of anhydride and the mixture was decanted, the ether phase washed with water, dried and concentrated to leave 37 g of an oily residue. Chromatography of this oil on silica gel (900 g) gave 29.49 g (77%) (ether-petroleum ether, 1:4) of pure oil (XIIa) which was used as such for the next step.

The IR and NMR were consistent with the structure.

EXAMPLE 21

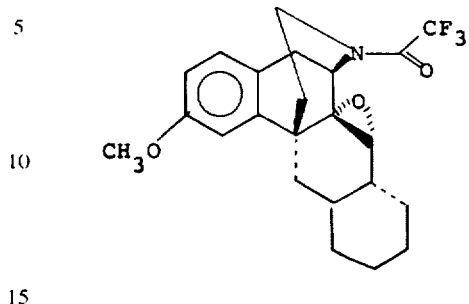

XIIIa 8,14α-epoxy-3-methoxy-6,7-trans-tetramethylene-17-trifluoracetylisomorphinan (XIIIa).

Oxidation of XIIa with m-chloroperbenzoic acid in a procedure essentially identical to that described in Example 7 produced a mixture of an oil from which material identified as the title compound XIIIa was recrystallized from methanol to give 34% of colorless solid; m.p. 132° – 134°.

Anal. calc'd. for $C_{23}H_{26}F_3NO_3$: C, 65.55; H, 6.22; N, 3.32%. Found: C, 65.90; H, 6.18; N, 3.30%.

The IR and NMR spectra were consistent with the structure.

The residual oil was saved for workup and isolation of the compound 8,14β-epoxy-3-methoxy-6,7-trans-tetramethylene-17-trifluoroactylmorphinan XIIIb.

EXAMPLE 22

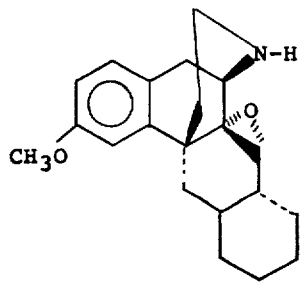

XIVa 8,14α-epoxy-3-methoxy-6,7-trans-tetramethyleneisomorphinan (XIVa).

A mixture of XIIIa (5.5 g, 0.013 mole) and sodium borohydride (0.495 g, 0.013 mole) in absolute ethanol (30 ml) was heated under reflux for 10 min. After cooling the mixture was poured into dilute hydrochloric acid (25 ml of a 10% solution) and the solution washed with ether. The aqueous layer was made basic with conc. ammonium hydroxide and extracted with ether (3 × 20 ml). The combined ether layers were dried over $Na_2SO_4$ and concentrated to give 5.2 g of an oil identified as compound XIVa which was used as such in the next step.

The IR and NMR spectra were consistent with the structure.

EXAMPLE 23

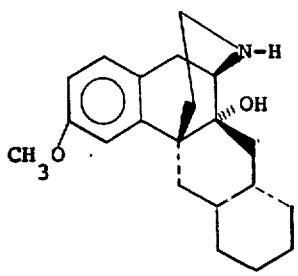

14α-hydroxy-3-methoxy-6,7-trans-tetramethyleneisomorphinan (XVa).

The amino epoxide XIVa (5.2 g, 0.016 mole) in THF (50 ml) was added dropwise to a stirred suspension of LiAlH$_4$ (3.0 g, 0.079 mole) in THF (25 ml). The mixture was heated under reflux for 1 hour, cooled and decomposed with water (3 ml), sodium hydroxide (2.25 ml of a 20% aqueous solution) and water (10.5 ml). Filtration over Celite and concentration left a colorless oil which was dissolved in ether (100 ml) and treated with an excess of a saturated hydrogen chloride solution in ether. The solid was collected by filtration and recrystallized from ethanol-ether; 2.90 g (50%), m.p. 282°–285°C. of title compound XVa.

Anal. calc'd. for $C_{21}H_{29}NO_2 \cdot HCl \cdot 1/2H_2O$: C, 67.63; H, 8.38; N, 3.76%. Found: C, 67.67; H, 8.50; N, 3.70%.

EXAMPLE 24

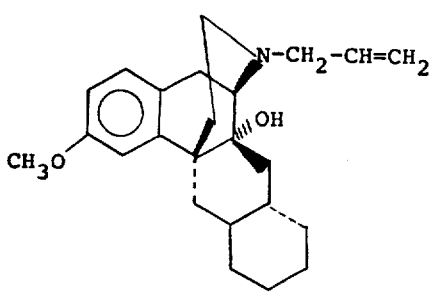

17-allyl-14α-hydroxy-3-methoxy-6,7-trans-tetramethyleneisomorphinan (Xe).

A mixture of the aminoalcohol XVa (from 2.20 g, 0.0065 mole of the HCl salt, Na$_2$CO$_3$ and CH$_2$Cl$_2$), triethylamine (2.7 g, 0.027 mole) and allyl bromide (1.1 g, 0.01 mole) in absolute ethanol (25 ml) was heated under reflux for 18 hours. After cooling, the mixture was poured into Na$_2$CO$_3$ (100 ml of a 10% solution) and extracted with methylene chloride (3 × 15 ml). Drying and concentration of the combined methylene chloride extract left an oil which was dissolved in ether and filtered over Celite. An excess of a saturated solution of hydrogen chloride in ether was added to the filtrates. The solid hydrochloride salt was collected by filtration and recrystallized from ethanol-ether; m.p. 192°–4° (Xe).

Anal. calc'd. for $C_{23}H_{33}NO_2 \cdot HCl \cdot H_2O$: C, 68.30; H, 8.59; N, 3.32%. Found: C, 67.58; H, 8.50; N, 3.35%.

EXAMPLE 25

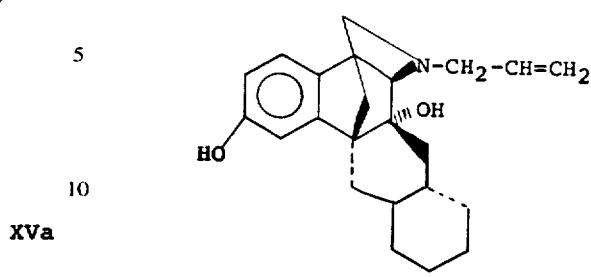

17-allyl-3,14α-dihydroxy-6,7-trans-tetramethyleneisomorphinan (XIe).

A solution of sodium ethanethiolate was prepared, under nitrogen, from sodium hydride (1.59 g of the 57% suspension in mineral oil, 0.037 mole) and ethanethiol (2.8 ml. 2.32 g, 0.0374 mole) in DMF (10 ml) at 0°C.

A solution of the methoxy compound Xe (from 1.5 g of the HCl salt, NH$_4$OH and CH$_2$Cl$_2$) in DMF (20 ml) was added to the above solution and the mixture was stirred and refluxed for 2 hours, cooled, poured into ice-water (50 ml), acidified to pH6 with hydrochloric acid and made basic with ammonium hydroxide. It was extracted with benzene (4 × 50 ml), dried over Na$_2$SO$_4$ and concentrated. The residual oil was dissolved in ether and treated with an excess of a solution of hydrogen chloride in ether. The solid hydrochloride salt was collected by filtration and recrystallized from ethanol-ether; m.p. 275° – 280°C.

Anal. calc'd. for $C_{23}H_{31}NO_2 \cdot HCl \cdot 1/2H_2O$: C, 69.24; H, 8.34; N, 3.51% Found: C, 69.40; H, 8.25; N, 3.53%.

EXAMPLE 26

*l*-17-cyclopropylmethyl-3,14α-dihydro-6,7-trans-tetramethyleneisomorphinan 3-(4'-nicotinoate).

To a solution of 0.002 mole of compound l-XIa in 3 ml of pyridine is added 0.0025 mole of 4-nicotinoyl chloride hydrochloride. The mixture is refluxed for one hour and the solvents evaporated. The residue is partitioned between ether and dilute ammonium hydroxide, the ether layer separated, washed with water, dried over anhydrous sodium sulfate, filtered and evaporated in vacuo to produce the desired nicotinoyl ester.

EXAMPLE 27

*l*-17-cyclopropylmethyl-3,14α-dihydroxy-6,7-trans-tetramethyleneisomorphinan 3(3'-nicotinoate-n-oxide).

Substitution in the procedure of Example 26 for the 4-nicotinoyl chloride hydrochloride used therein of an equimolar quantity of 3-nicotinoyl chloride-N-oxide produces the desired ester.

EXAMPLE 28

3-monomethoxymethyl ether of
*l*-17-cyclopropylmethyl-3,14α-hydroxy-6,7-trans-tetramethyleneisomorphinan.

Chloromethylmethyl ether (0.01 mole) is placed into 10 ml of dry dimethylformamide and the resulting solution is added to 0.0075 mole of compound l-XIa dissolved in 20 ml of dry diemthylformamide. Anhydrous sodium carbonate (0.011 mole) as a fine powder is added to the solution with stirring at about room temperature. Stirring is continued for about 5 hours. The solution is filtered from the sodium carbonate, evaporated to dryness in vacuo to produce the essentially pure title product.

EXAMPLE 29

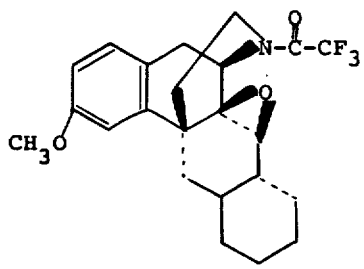

8,14β-epoxy-3-methoxy-6,7-trans-tetramethylene-17-trifluoroacetylmorphinan (XIIIb).

The methanol filtrates from Example 21 were evaporated in vacuo and chromatographed over silica gel to yield the title product XIIIb.

EXAMPLE 30

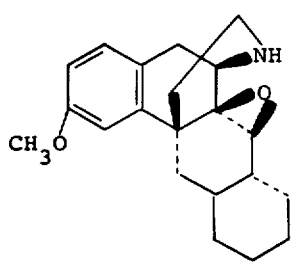

8,14β-epoxy-3-methoxy-6,7-trans-tetramethylenemorphinan (XIVb).

Substitution in the procedure of Example 22 for the compound XIVa used therein of an equimolar quantity of compound XIVb produces the title product XIVb.

EXAMPLE 31

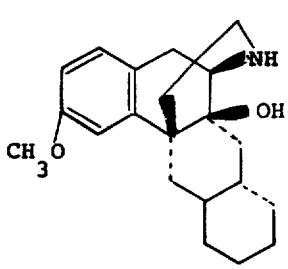

14β-hydroxy-3-methoxy-6,7-trans-tetramethylenemorphinan XVb.

Substitution in the procedure of Example 23 for the compound XIVa used therein of an equimolar quantity of compound XIVb produces the title product XVb.

All temperatures expressed herein are in degrees centigrade.

EXAMPLE 32

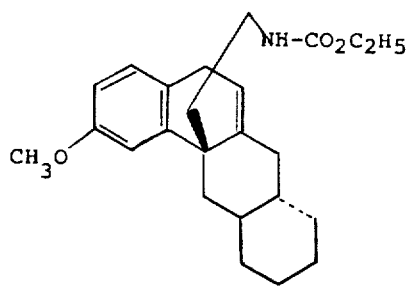

XXX

12α-β-aminoethyl-5,7,7a,8,9,10,11,11a,12,12a-decahydro-n-carbethoxy-2-methoxy-7a,11a-trans-benz[α]anthracene (XXX).

12α-β-Aminoethyl-5,7,7a,8,9,10,11,11a,12,12a-decahydro-2-methoxy-7a,11a-trans-Benz[α]anthracene (Va) [9.60 g., 0.03 mole] and pyridine (3.0 g, 0.035 mole) in chloroform (150 ml) was treated, dropwise and at 0°, with ethylchloroformate (3.8 g, 0.035 mole) in chloroform (50 ml). After stirring for 10 minutes, the reaction mixture was evaporated in vacuo to leave 13.0 g of an oily reaction residue identified as the title product XXX.

EXAMPLE 33

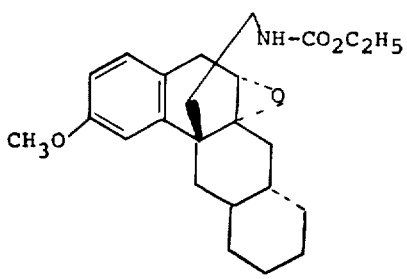

XXXIb

12α-β-aminoethyl-5, 6, 6a, 7, 7a, 8, 9, 10, 11, 11a, 12, 12a-dodecahydro-n-carbethoxy-6, 6a-α-epoxy-2-methoxy-7a, 11a-trans-benz[α]anthracene (XXXIb).

12α-β-Aminoethyl-5,7,7a,8,9,10,11,11a,12, 12a-decahydro-N-carbethoxy-2-methoxy-7a,11a-trans-benz[α]-anthracene (XXX), as obtained in Example 32, was oxidized with m-chloroperbenzoic acid in a procedure essentially identical to that described in Example 7 and produced 13.3 g. of crude title product XXXIb. The IR and NMR were consistent with the structure.

EXAMPLE 34

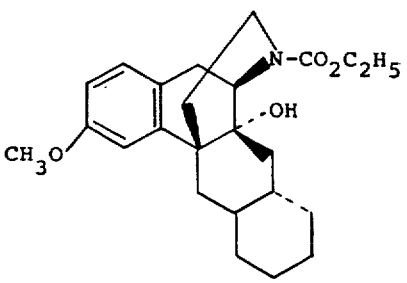

XXXII n-carbethoxy-14α-hydroxy-3-methoxy-6,7-trans-tetramethyleneisomorphinan (XXXIII).

The crude epoxide XXXIIb (13.3 g), dissolved in benzene (25 ml), was added dropwise to a solution of sodium isoamylate which was prepared from sodium hydride (0.04 mole) and isoanyl alcohol (3.1 g, 0.035 mole) in 100 ml of benzene.

After a 24 hour reflux period, the mixture was cooled, washed with water, dried over sodium sulfate, filtered and concentrated in vacuo to yield 6.42 g of a crude, reddish colored oil which was identified as the title product XXXIII.

EXAMPLE 35

14α-hydroxy-3-methoxy-6,7-trans-tetramethyleneisomorphinan [XVa, alternate procedure].

The reddish colored oil [3.0 g, XXXIII] obtained in Example 34 was refluxed for 45 minutes with a solution of KOH (2.8 g) in octanol (25 ml), cooled and poured into ice-water. The usual acid-base extraction afforded crude XVa which was purified through its hydrochloric acid salt: 1.0 g; m.p. 282°–285°; identical (I.R., N.M.R. T.L.C., mixed M.P.) with a sample prepared by Example 23.

We claim:

1. A compound having the formula

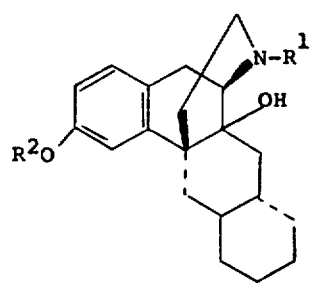

L wherein $R^1$ is selected from the group consisting of —$CH_2$—C≡CH, H, —$CH_2$—CH=$CH_2$,

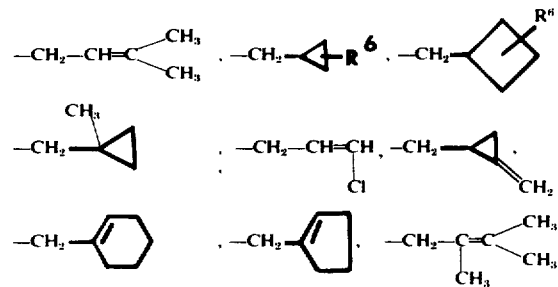

and

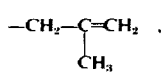

in which $R^6$ is H or $CH_3$, $R^2$ is selected from the group consisting of H, (lower)alkyl of 1 to 6 carbon atoms,

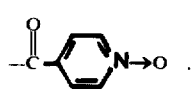

(lower)alkanoyl of 2 to 6 carbon atoms,

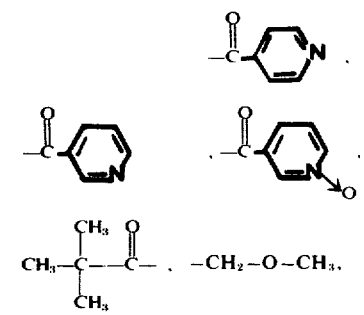

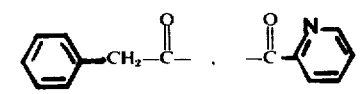

and

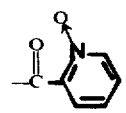

or a pharmaceutically acceptable acid addition salt thereof.

2. A compound of claim 1 having the formula

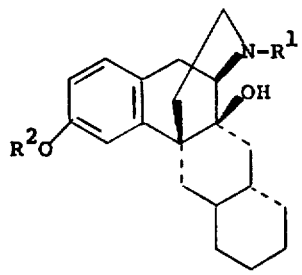

XXXX in which $R^1$ is selected from the group consisting of —$CH_2$—C≡CH, H, —$CH_2$—CH=$CH_2$,

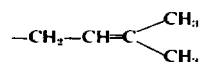

(lower)alkyl of 1 to 6 carbon atoms,

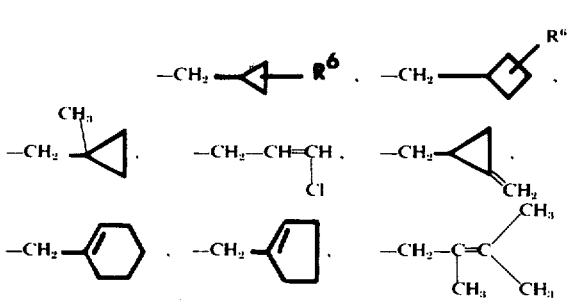

and 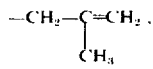

in which R⁶ is H or CH₃, R² is selected from the group consisting of H, (lower)alkyl of 1 to 6 carbon atoms,

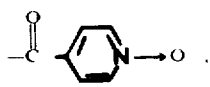

(lower)alkanoyl of 2 to 6 carbon atoms,

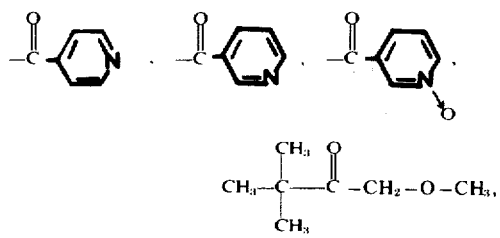

—CH₂—O—CH₃,

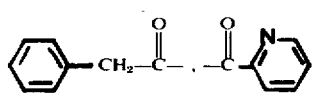

and

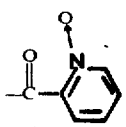

or a pharmaceutically acceptable acid addition salt thereof.

3. A compound of claim 2 wherein R¹ is —CH₂—CH=CH₂, —CH₂—C ≡ CH,

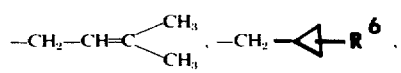

or

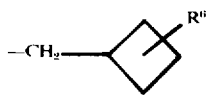

in which R⁶ is H or CH₃ and R² is H, CH₃,

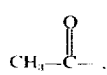

or

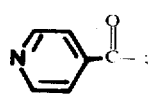

or a pharmaceutically acceptable acid addition salt thereof.

4. A compound of claim 2 wherein R¹ is

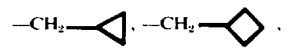

or —CH₂—CH=CH₂ and R² is H, CH₃ or

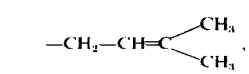

or a pharmaceutically acceptable acid addition salt thereof.

5. The compound of claim 2 wherein R¹ is

—CH₂—◁ and R² is H; or the hydrochloride salt thereof.

6. The compound of claim 2 wherein R¹ is

—CH₂—◇ and R² is H; or the hydrochloride salt thereof.

7. The compound of claim 2 wherein R¹ is —CH₂—CH=CH₂ and R² is H; or the hydrochloride salt thereof.

8. The compound of claim 2 wherein R¹ is H and R² is H or methyl; or an acid addition salt thereof.

9. A compound of claim 1 having the formula

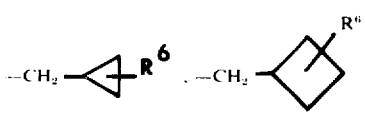

XXXXI wherein R¹ is selected from the group consisting of —CH₂—C ≡ CH, —CH₂—CH=CH₂,

—CH₂—CH=C(CH₃)(CH₃), (lower)alkyl of 1 to 6 carbon atoms,

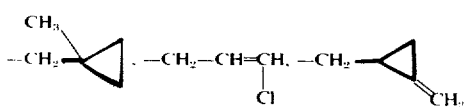

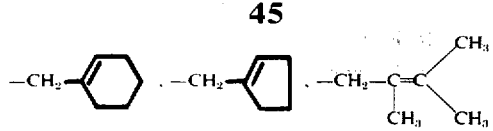

and

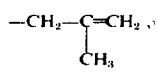

in which $R^6$ is H or $CH_3$, $R^2$ is selected from the group consisting of H, (lower)alkyl of 1 to 6 carbon atoms,

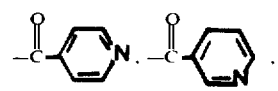

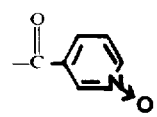

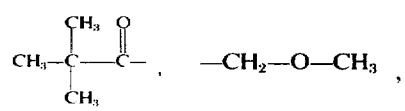

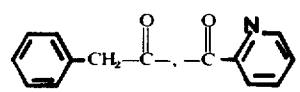

and

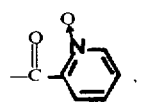

or a pharmaceutically acceptable acid addition salt thereof.

10. A compound of claim 9 wherein $R^1$ is $-CH_2-CH=CH_2$ $-CH_2-C\equiv CH$,

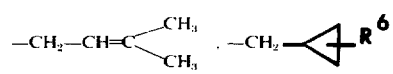

or

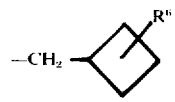

in which $R^6$ is H or $CH_3$, $R^2$ is H,

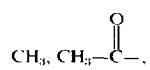

or

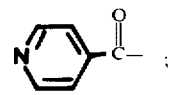

or a pharmaceutically acceptable acid addition salt thereof.

11. A compound of claim 9 wherein $R^1$ is

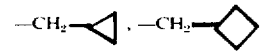

or $-CH_2-CH=CH_2$, $R^2$ is H, $CH_3$ or

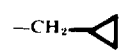

or a pharmaceutically acceptable acid addition salt thereof.

12. The compound of claim 9 wherein $R^1$ is

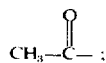

and $R^2$ is H; or the hydrochloride salt thereof.

13. The compound of claim 9 wherein $R^1$ is

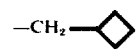

and $R^2$ is H; or the hydrochloride salt thereof.

14. The compound of claim 9 wherein $R^1$ is $-CH_2-CH=CH_2$ and $R^2$ is H; or the hydrochloride salt thereof.

15. The compound of claim 9 wherein $R^1$ is H and $R^2$ is H or methyl; or an acid addition salt thereof.

16. The levorotatory isomers of the compounds of claim 2.

17. The dextrorotatory isomers of the compounds of claim 2.

18. The levorotatory isomers of the compounds of claim 9.

19. The dextrorotatory isomers of the compounds of claim 9.

20. A compound having the formula

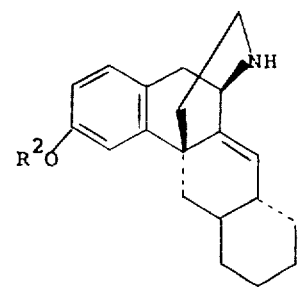

in which $R^2$ is (lower)alkyl of 1 to 6 carbon atoms.

21. A compound having the formula
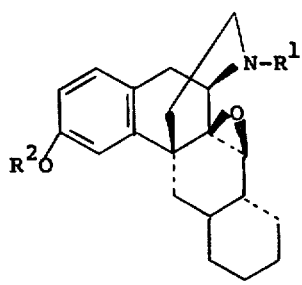
or
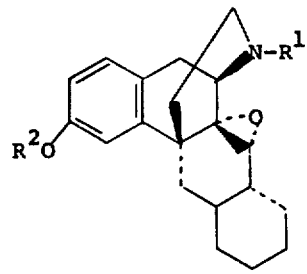
in which $R^2$ is (lower)alkyl of 1 to 6 carbon atoms, and $R^1$ is H, (lower)alkyl of 1 to 6 carbon atoms,
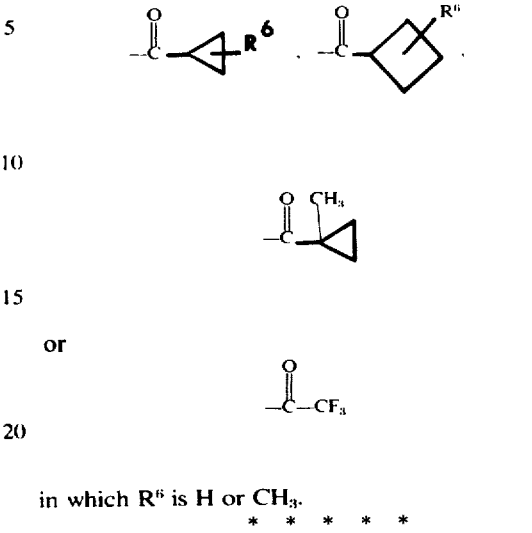
in which $R^6$ is H or $CH_3$.
* * * * *